US012750183B2

(12) United States Patent
Hirzallah et al.

(10) Patent No.: US 12,750,183 B2
(45) Date of Patent: Sep. 29, 2026

(54) DYNAMIC POSITIONING REFERENCE UNIT CONFIGURATIONS

(71) Applicant: QUALCOMM Incorporated, San Diego, CA (US)

(72) Inventors: Mohammed Ali Mohammed Hirzallah, San Diego, CA (US); Marwen Zorgui, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 517 days.

(21) Appl. No.: 18/169,824

(22) Filed: Feb. 15, 2023

(65) Prior Publication Data

US 2024/0275547 A1 Aug. 15, 2024

(51) Int. Cl.
*H04L 5/00* (2006.01)
*H04W 24/10* (2009.01)

(52) U.S. Cl.
CPC ........... *H04L 5/0051* (2013.01); *H04W 24/10* (2013.01)

(58) Field of Classification Search
CPC .... H04L 5/0051; H04L 5/0048; H04W 24/10; G01S 5/02; G01S 13/765; G01S 5/0205; G01S 5/0036; H04B 17/27
See application file for complete search history.

(56) References Cited

U.S. PATENT DOCUMENTS

2009/0312005 A1* 12/2009 Mukundan ............ H04L 1/0002 455/422.1
2014/0324748 A1* 10/2014 Modica .................. G06N 20/00 706/20
2017/0280296 A1* 9/2017 Divakaran ............ H04W 4/025
2020/0163044 A1* 5/2020 Bapat .................. H04L 25/0224
2020/0205104 A1* 6/2020 Akkarakaran .......... H04W 8/24
2020/0265104 A1* 8/2020 Belt .................... G06F 16/9537
2021/0266859 A1* 8/2021 Yu ............................ G01S 5/04
(Continued)

FOREIGN PATENT DOCUMENTS

CN 118661455 A * 9/2024 ............ H04W 24/10
WO 2022155050 A1 7/2022
(Continued)

OTHER PUBLICATIONS

International Search Report and Written Opinion—PCT/US2024/013661—ISA/EPO—Jun. 10, 2024.

*Primary Examiner* — Edan Orgad
(74) *Attorney, Agent, or Firm* — Procopio, Cory, Hargreaves & Savitch LLP

(57) ABSTRACT

A positioning reference unit (PRU) may transmit a first set of sounding reference signals (SRSs) for a first wireless device to measure the first set of SRSs for a first set of uplink (UL) positioning measurements. The PRU may receive a first set of positioning reference signals (PRSs) from the first wireless device. The PRU may measure the first set of PRSs for a first set of downlink (DL) positioning measurements. The PRU may transmit a second set of PRSs for a second wireless device to measure the second set of PRSs for a second set of DL positioning measurements. The PRU may receive a second set of SRSs from the second wireless device. The PRU may measure the second set of SRSs for a second set of UL positioning measurements after receiving the second set of SRSs from the second wireless device.

25 Claims, 15 Drawing Sheets

(56) References Cited

U.S. PATENT DOCUMENTS

| | | | | |
|---|---|---|---|---|
| 2022/0022158 | A1* | 1/2022 | Zarifi | H04L 5/0048 |
| 2022/0110088 | A1 | 4/2022 | Bao et al. | |
| 2022/0173857 | A1* | 6/2022 | Michalopoulos | H04B 17/27 |
| 2023/0232266 | A1* | 7/2023 | Li | H04W 64/00<br>370/329 |
| 2023/0262647 | A1* | 8/2023 | Ren | G01S 5/0036<br>455/456.1 |
| 2023/0299917 | A1* | 9/2023 | Ren | H04W 72/11 |
| 2023/0370221 | A1* | 11/2023 | Schaepperle | H04L 5/0048 |
| 2023/0388839 | A1 | 11/2023 | Lyazidi et al. | |
| 2024/0107487 | A1* | 3/2024 | Manolakos | H04W 24/10 |
| 2024/0129085 | A1* | 4/2024 | Manolakos | G01S 1/0428 |
| 2024/0147407 | A1* | 5/2024 | Zorgui | G06N 3/092 |
| 2024/0211540 | A1* | 6/2024 | Olsen | G06T 3/4046 |
| 2024/0259986 | A1* | 8/2024 | Ko | G01S 5/0284 |
| 2024/0284297 | A1* | 8/2024 | Yoon | G01S 5/0036 |
| 2024/0295625 | A1* | 9/2024 | Hasegawa | G01S 5/0263 |
| 2024/0298288 | A1* | 9/2024 | Duan | G01S 13/765 |
| 2024/0305423 | A1* | 9/2024 | Lyazidi | H04L 5/0051 |
| 2024/0414680 | A1* | 12/2024 | Chuang | H04W 56/0065 |
| 2025/0056473 | A1* | 2/2025 | Li | H04L 5/0053 |
| 2025/0062875 | A1* | 2/2025 | Hirzallah | H04L 5/0053 |
| 2025/0081142 | A1* | 3/2025 | Hasegawa | G01S 19/34 |
| 2025/0158767 | A1* | 5/2025 | Bao | H04W 64/003 |
| 2025/0159706 | A1* | 5/2025 | Kazmi | H04L 5/0044 |
| 2026/0012958 | A1* | 1/2026 | Oteri | H04L 5/0048 |
| 2026/0059472 | A1* | 2/2026 | Oteri | H04W 64/00 |

FOREIGN PATENT DOCUMENTS

| | | | | |
|---|---|---|---|---|
| WO | 2022213008 | A1 | 10/2022 | |
| WO | 2022245188 | A1 | 11/2022 | |
| WO | WO-2024027905 | A1 * | 2/2024 | H04W 64/00 |
| WO | WO-2024161471 | A1 * | 8/2024 | H04W 64/00 |

* cited by examiner

DYNAMIC POSITIONING REFERENCE UNIT CONFIGURATIONS

TECHNICAL FIELD

The present disclosure relates generally to communication systems, and more particularly, to a wireless positioning system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a first wireless device. The apparatus may transmit a first set of sounding reference signal (SRSs) for a second wireless device to measure the first set of SRSs for a first set of uplink (UL) positioning measurements. The apparatus may receive a first set of positioning reference signal (PRSs) from the second wireless device. The apparatus may measure the first set of PRSs for a first set of downlink (DL) positioning measurements. The apparatus may transmit a second set of PRSs for a third wireless device to measure the second set of PRSs for a second set of DL positioning measurements. The apparatus may receive a second set of SRSs from the third wireless device. The apparatus may measure the second set of SRSs for a second set of UL positioning measurements after receiving the second set of SRSs from the third wireless device. The first wireless device may include a first positioning reference unit (PRU). The second wireless device may include a network node or a second PRU. The third wireless device may include a user equipment (UE) or a third PRU.

In an aspect of the disclosure, a method, a computer-readable medium, and an apparatus are provided. The apparatus may include a UE. The apparatus may transmit a first set of SRSs for a network node to measure the first set of SRSs for a first set of UL positioning measurements. The apparatus may receive a first set of PRSs from the network node. The apparatus may measure the first set of PRSs for a first set of DL positioning measurements. The apparatus may transmit a second set of SRSs for a PRU to measure the second set of SRSs for a second set of UL positioning measurements. The apparatus may receive a second set of PRSs from the PRU. The apparatus may measure the second set of PRSs for a second set of DL positioning measurements after receiving the second set of PRSs from the PRU. The network node may serve the UE.

In an aspect of the disclosure, a method, a computer-readable medium, and an apparatus are provided. The apparatus may include a network node. The apparatus may transmit a first set of PRSs for a UE to measure the first set of PRSs for a first set of DL positioning measurements. The apparatus may receive a first set of SRSs from the UE. The apparatus may measure the first set of SRSs for a first set of UL positioning measurements. The apparatus may transmit a second set of PRSs for a PRU to measure the second set of PRSs for a second set of DL positioning measurements. The apparatus may receive a second set of SRSs from the PRU. The apparatus may measure the second set of SRSs for a second set of UL positioning measurements. The apparatus may serve the UE.

In an aspect of the disclosure, a method, a computer-readable medium, and an apparatus are provided. The apparatus may include a network node. The apparatus may receive, from a PRU, an NRPPa message. The NRPPa message may include a first positioning report based on a set of UL positioning measurements of a set of SRSs received by the PRU. The apparatus may receive, from the PRU, an LPPa message. The LPPa message may include a second positioning report based on a set of DL positioning measurements of a set of PRSs received by the PRU. The apparatus may perform positioning on a wireless device communicating with the PRU based on the first and second positioning reports. The apparatus may be a location management function (LMF).

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
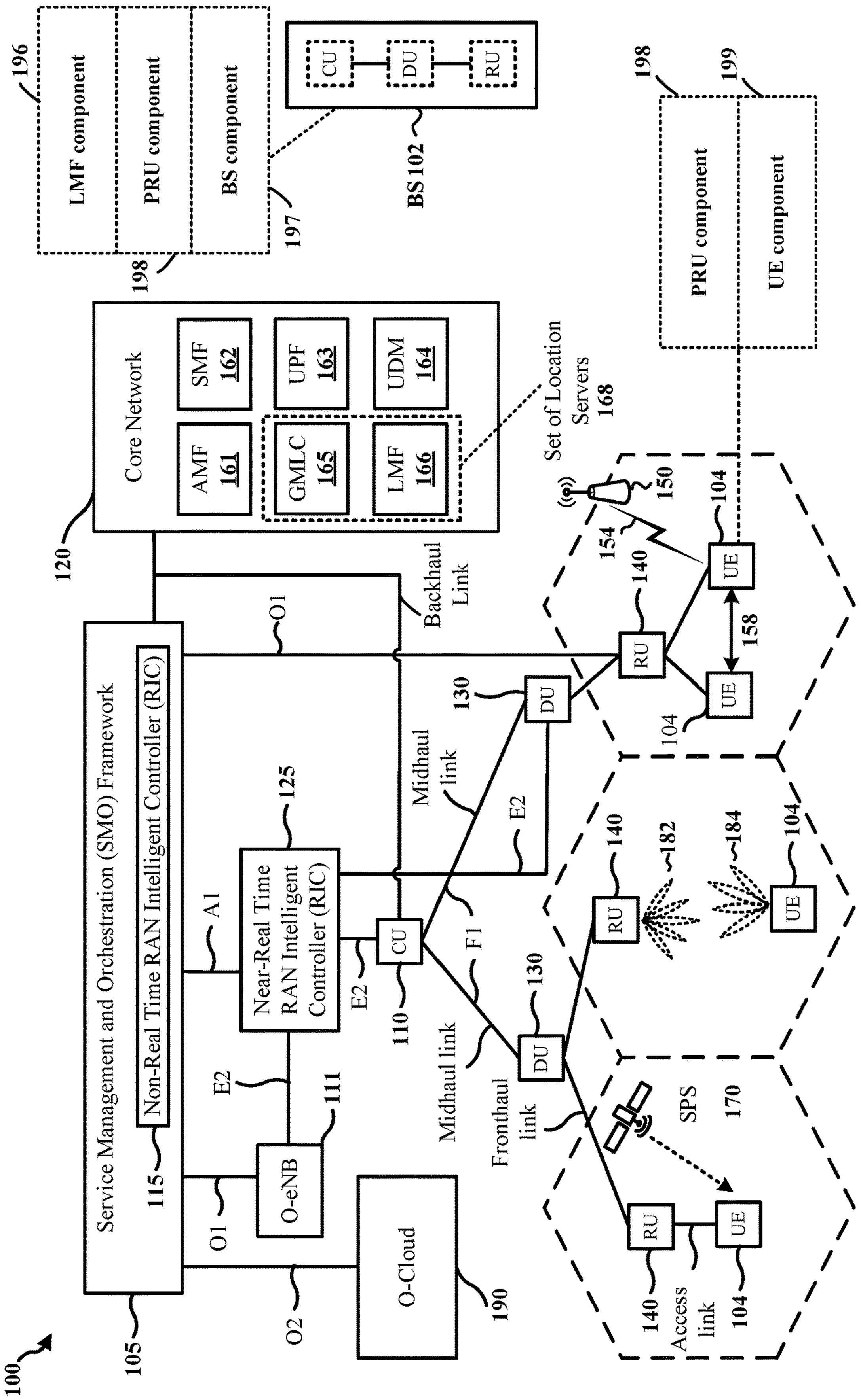
FIG. 1 is a diagram illustrating an example of a wireless communications system and an access network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

A user equipment (UE) may be configured to perform positioning with a network node, such as a transmission reception point (TRP) of a base station. The UE may transmit a set of sounding reference signals (SRSs) to the network node, for the network node to measure, and the network node may transmit a set of positioning reference signals (PRSs) for the UE to measure. The measurements may be used to calculate a position of the UE relative to one or more network nodes with known locations. For example, the UE may measure a round-trip-time (RTT) between a transmission of an SRS from the UE to a network node and a transmission of a PRS from the network node back to the UE to calculate the distance between the UE and the network node. The UE may triangulate its position by calculating its distance from two or more network nodes with known locations.

A positioning reference unit (PRU) may be configured to emulate either a UE or a network node when performing positioning, such that the PRU may function as a network node when communicating with a UE (e.g., by transmitting a set of PRSs to the UE and by receiving/measuring a set of SRSs from the UE), and may function as a UE when communicating with a network node (e.g., by transmitting a set of SRSs to the network node and by receiving/measuring a set of PRSs from the network node). The PRU may be leveraged by UEs, network nodes, or other PRUs to generate measurements, and may share positioning reports using multiple protocols to collect and share data for training positioning models, including calculating labels for training. A positioning model may be generated using artificial intelligence machine learning (AIML), using a set of inputs (e.g., PRS measurements or SRS measurements) and a set of labels. A label may be a calculated expected result associated with a set of inputs, such as a location of a wireless device or an intermediate measurement (e.g., a timing measurement, an angle measurement, a LOS identification) that may be used to calculate a location of a wireless device. A set of inputs and a set of labels may be used for generating and/or training a positioning model using AIML. The PRU may be configured to function as a UE that is fixed in place in a known location while performing positioning, and as a mobile network node that is fixed in place in a known location while performing positioning, to help enrich and diversify training data for both uplink (UL) and downlink (DL) inputs and labels for training a positioning model. The training data may have features, such as radio frequency fingerprints (RFFPs) that consider locations of devices acting as network nodes during positioning (e.g., TRPs or PRUs) to provide more compressive positioning training data.

A first wireless device (e.g., a first PRU configured to emulate both a UE and a network node) may transmit a first set of SRSs for a second wireless device (e.g., a network node or a second PRU configured to emulate a network node) to measure the first set of SRSs for a first set of UL positioning measurements. The first wireless device may receive a first set of PRSs from the second wireless device. The first wireless device may measure the first set of PRSs for a first set of DL positioning measurements. The first wireless device may transmit a second set of PRSs for a third wireless device (e.g., a UE or a third PRU configured to emulate a UE) to measure the second set of PRSs for a second set of DL positioning measurements. The first wireless device may receive a second set of SRSs from the third wireless device. The first wireless device may measure the second set of SRSs for a second set of UL positioning measurements after receiving the second set of SRSs from the third wireless device.

Various aspects relate generally to exchanging positioning signals with wireless devices. Some aspects more specifically relate to supporting both SRS and PRS transmission with wireless devices and SRS and PRS reception with wireless devices. Some aspects more specifically relate to supporting sharing positioning reports based on measuring sets of SRSs using long-term evolution (LTE) positioning protocol (LPP) annex (LPPa) messages and sharing positioning reports based on measuring sets of PRSs using new radio (NR) positioning protocol (NRPP) annex (NRPPa) messages. In some examples, a PRU may be configured to act as a next generation (NG) RAN (NG-RAN) node with a known location. In other examples, a PRU may be configured to support reporting as an NG-RAN node using NRPPa messages. In some examples, a PRU may be configured to act as a UE with a known location. In other examples, a PRU may be configured to support reporting as a UE using LPPa messages. As such, a PRU may be configured to provide positioning data as a UE and/or a base station with a known location, and may use high-accuracy data (e.g., a high-accuracy global navigation satellite system (GNSS) device or a known location that a UE is placed for providing positioning data) to train a positioning model, such as an artificial intelligence machine learning (AIML) model.

Particular aspects of the subject matter described in this disclosure can be implemented to realize one or more of the following potential advantages. In some examples, by configuring a PRU to emulate either a UE or a network node when performing positioning, the described techniques can be used to collect training data for training a positioning model. A PRU may be equipped with accurate sensors to obtain clean labels used for accurate training. By enabling the PRU to support some NG-RAN node functionality, such as transmitting sets of PRSs, receiving and measuring sets of SRSs, and/or transmitting SRS measurement data via NRPPa messages, the PRU may collect training data as either a UE or a network node, and may have full control of data on either side of positioning. A chip may be embedded in a UE or a TRP to upgrade it to have PRU functionality. Such a PRU may generate high fidelity and diversified training data collection for positioning solutions. The high fidelity and diversified training data may also be shared to other positioning solution providers to improve their training data.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHZ-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term “sub-6 GHz” or the like if used herein may broadly represent frequencies that may be less than 6 GHZ, may be within FR1, or may include mid-band frequencies. Further, unless specifically stated otherwise, the term “millimeter wave” or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and/or an velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a positioning reference unit (PRU) component 198 that may be configured to transmit a first set of sounding reference signal (SRSs) for a second wireless device to measure the first set of SRSs for a first set of uplink (UL) positioning measurements. The PRU component 198 may be configured to receive a first set of positioning reference signal (PRSs) from the second wireless device. The PRU component 198 may be configured to measure the first set of PRSs for a first set of downlink (DL) positioning measurements. The PRU component 198 may be configured to transmit a second set of PRSs for a third wireless device to measure the second set of PRSs for a second set of DL positioning measurements. The PRU component 198 may be configured to receive a second set of SRSs from the third wireless device. The PRU component 198 may be configured to measure the second set of SRSs for a second set of UL positioning measurements after receiving the second set of SRSs from the third wireless device. The UE 104 may be a positioning reference unit (PRU) with a known location. The second wireless device may include a network node, such as the base station 102 or a second PRU. The third wireless device may include a UE, such as a different UE 104, or a third PRU.

Referring again to FIG. 1, in certain aspects, the UE 104 may have a UE component 199 that may be configured to transmit a first set of SRSs for a network node, such as the base station 102, to measure the first set of SRSs for a first set of UL positioning measurements. The UE component 199 may be configured to receive a first set of PRSs from the network node. The UE component 199 may be configured to measure the first set of PRSs for a first set of DL positioning measurements. The UE component 199 may be configured to transmit a second set of SRSs for a PRU to measure the second set of SRSs for a second set of UL positioning measurements. The UE component 199 may be configured to receive a second set of PRSs from the PRU. The UE component 199 may be configured to measure the second set of PRSs for a second set of DL positioning measurements after receiving the second set of PRSs from the PRU.

Referring again to FIG. 1, in certain aspects, the base station 102 may have a PRU component 198 that may be configured to transmit a first set of SRSs for a second wireless device to measure the first set of SRSs for a first set of UL positioning measurements. The PRU component 198 may be configured to receive a first set of PRSs from the second wireless device. The PRU component 198 may be configured to measure the first set of PRSs for a first set of DL positioning measurements. The PRU component 198 may be configured to transmit a second set of PRSs for a third wireless device to measure the second set of PRSs for a second set of DL positioning measurements. The PRU component 198 may be configured to receive a second set of SRSs from the third wireless device. The PRU component 198 may be configured to measure the second set of SRSs for a second set of UL positioning measurements after receiving the second set of SRSs from the third wireless device. The base station 102 may be a positioning reference unit (PRU). The base station 102 may be a mobile TRP with a known location. The second wireless device may include a network node, such as another base station 102 or a second PRU. The third wireless device may include a UE, such as the UE 104, or a third PRU.

Referring again to FIG. 1, in certain aspects, the base station 102 may have a BS component 197 that may be configured to transmit a first set of PRSs for a UE, such as the UE 104, to measure the first set of PRSs for a first set of DL positioning measurements. The BS component 197 may be configured to receive a first set of SRSs from the UE. The BS component 197 may be configured to measure the first set of SRSs for a first set of UL positioning measurements. The BS component 197 may be configured to transmit a second set of PRSs for a PRU to measure the second set of PRSs for a second set of DL positioning measurements. The BS component 197 may be configured to receive a second set of SRSs from the PRU. The BS component 197 may be configured to measure the second set of SRSs for a second set of UL positioning measurements. The base station 102 may serve the UE.

Referring again to FIG. 1, in certain aspects, the base station 102 may have a location management function (LMF) component 196 that may be configured to receive, from a PRU, a new radio (NR) positioning protocol (NRPP) annex (NRPPa) message. The NRPPa message may include a first positioning report based on a set of UL positioning measurements of a set of SRSs received by the PRU. The LMF component 196 may be configured to receive, from the PRU, a long-term evolution (LTE) positioning protocol (LPP) annex (LPPa) message. The LPPa message may include a second positioning report based on a set of DL positioning measurements of a set of PRSs received by the PRU. The LMF component 196 may be configured to perform positioning on a wireless device communicating with the PRU based on the first and second positioning reports. The base station 102 may be an LMF, such as the LMF 166. The PRU component 198 may enable a UE to perform positioning like both a UE and a base station, and may enable a base station to perform positioning like both a UE and a base station, and may communicate with a coordinating server network node, such as an LMF, like both a UE and a base station, diversifying positioning and training data for coordinating positioning measurements and configuration, which may be used to train or utilize positioning models, for example by using artificial intelligence machine learning (AIML) to generate and/or train a positioning model.

Figures 2A, 2B, 2C, 2D:
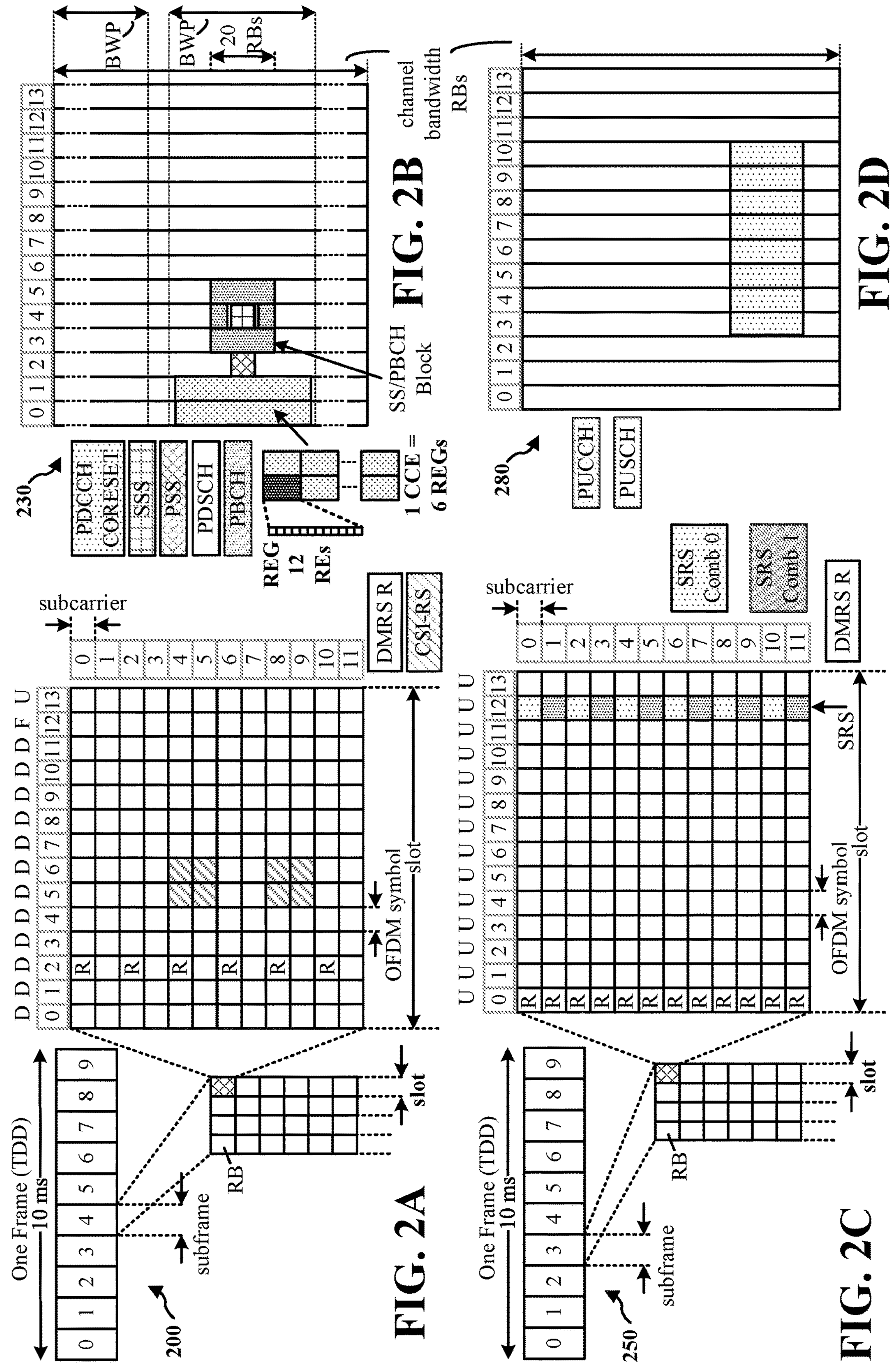
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
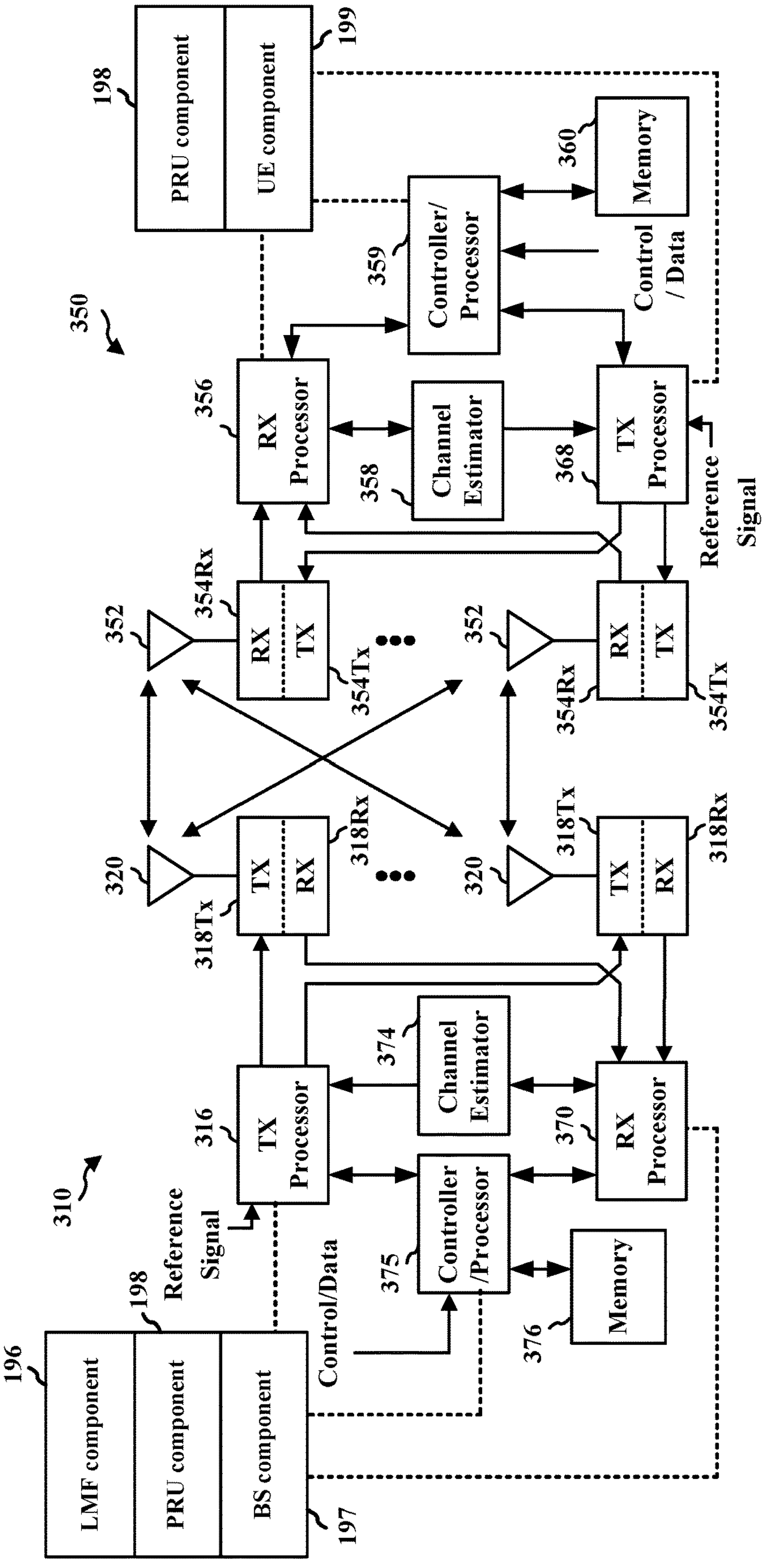
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the PRU component 198 of FIG. 1.

At least one of the TX processor 368, the RX processor 356, and the controller/processor 359 may be configured to perform aspects in connection with the UE component 199 of FIG. 1.

At least one of the TX processor 316, the RX processor 370, and the controller/processor 375 may be configured to perform aspects in connection with the PRU component 198 of FIG. 1.

At least one of the TX processor 316, the RX processor 370, and the controller/processor 375 may be configured to perform aspects in connection with the BS component 197 of FIG. 1.

At least one of the TX processor 316, the RX processor 370, and the controller/processor 375 may be configured to perform aspects in connection with the LMF component 196 of FIG. 1.

Figure 4:
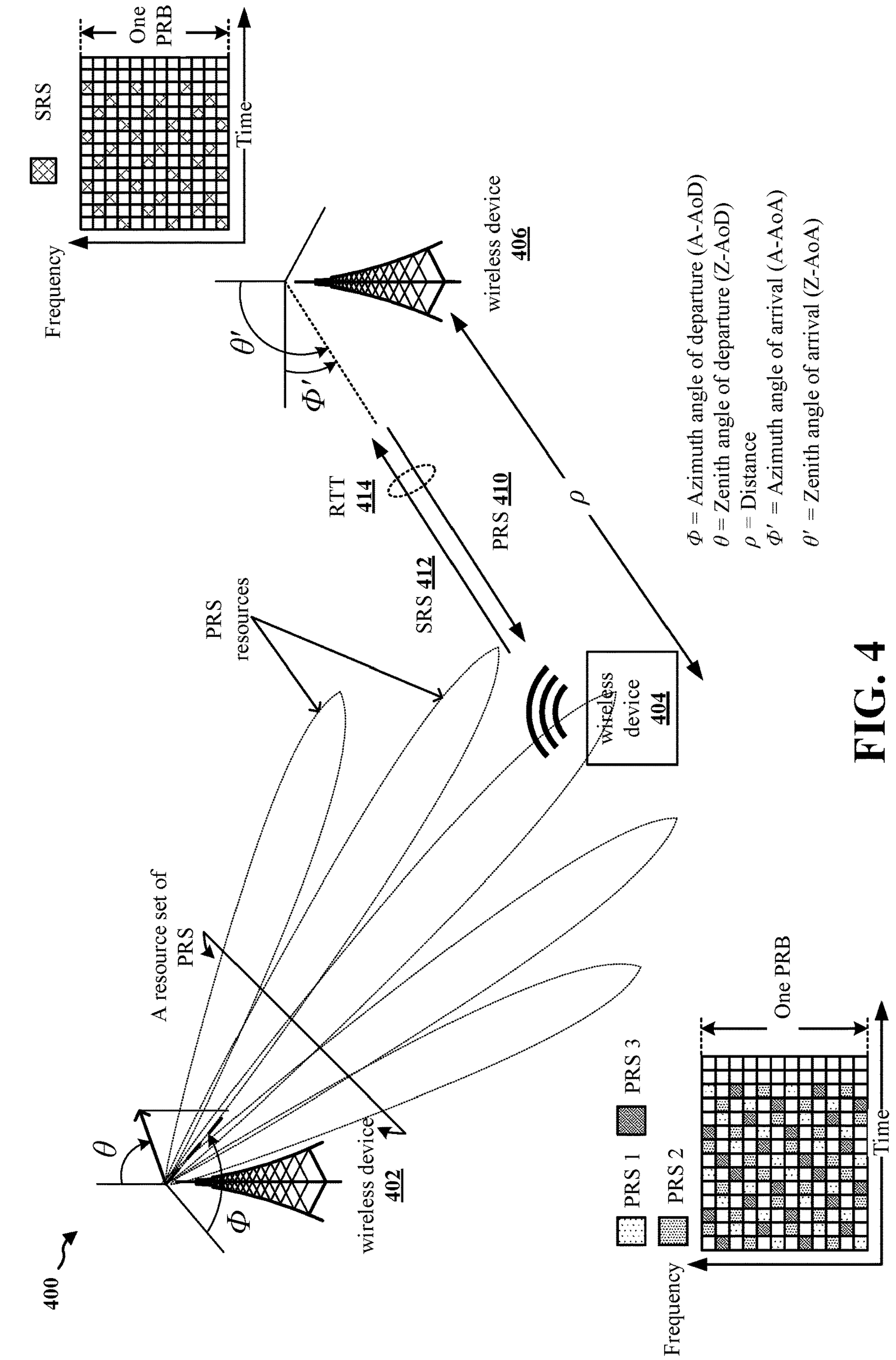
FIG. 4 is a diagram illustrating an example of a UE positioning based on reference signal measurements.

FIG. 4 is a diagram 400 illustrating an example of positioning based on reference signal measurements. The wireless device 402 may be a UE, a base station, or a positioning reference unit (PRU). The wireless device 404 may be a UE, a base station, or a PRU. The wireless device 406 may be a UE, a base station, or a PRU. The wireless device 402 may be referred to as a positioning target wireless device, whose location may be calculated based on measurements of one or more reference signals. The wireless device 404 and the wireless device 406 may be referred to as positioning neighbor wireless devices, whose locations may be known, which may be used to calculate the location of the wireless device 402. The wireless device 404 may transmit SRS 412 at time $T_{SRS\_TX}$ to the wireless device 406. The wireless device 404 may receive positioning reference signals (PRS) 410 at time $T_{PRS\_RX}$ from the wireless device 406. The SRS 412 may be an UL-SRS. The PRS 410 may be a DL-PRS. In some aspects, the wireless device 402 may be a TRP and the wireless device 406 may be a TRP, which may be both configured to transmit DL-PRS to the wireless device 404. The wireless device 404 may be a UE configured to transmit UL-SRS to the wireless device 402 and the wireless device 406.

The wireless device 406 may receive the SRS 412 at time $T_{SRS\_RX}$ from the wireless device 404 and transmit the PRS 410 at time $T_{PRS\_TX}$ to the wireless device 404. The wireless device 404 may receive the PRS 410 before transmitting the SRS 412. The wireless device 404 may transmit the SRS 412 before receiving the PRS 410. The wireless device 404 may transmit the SRS 412 in response to receiving the PRS 410. The wireless device 406 may transmit the PRS 410 in response to receiving the SRS 412. A positioning server (e.g., location server(s) 168), the wireless device 404, or the wireless device 406 may determine the round-trip-time (RTT) 414 based on $||T_{SRS\_RX}-T_{PRS\_TX}|-|T_{SRS\_TX}-T_{PRS\_RX}||$. Multi-RTT positioning may make use of the Rx-Tx time difference measurements (i.e., $|T_{SRS\_TX}-T_{PRS\_RX}|$) and PRS reference signal received power (RSRP) (PRS-RSRP) of PRS signals received from multiple wireless devices, such as the wireless device 402 and the wireless device 406, which are measured by the wireless device 404, and the measured Rx-Tx time difference measurements (i.e., $|T_{SRS\_RX}-T_{PRS\_TX}|$) and SRS-RSRP at multiple wireless devices, such as at the wireless device 402 and at the wireless device 406 of SRS transmitted from wireless device 404. The wireless device 404 may measure the Rx-Tx time difference measurements, and/or PRS-RSRP of the received signals, using assistance data received from the positioning server, the wireless device 402, and/or the wireless device 406. The wireless device 402 and the wireless device 406 may measure the Rx-Tx time difference measurements, and/or SRS-RSRP of the received signals, using assistance data received from the positioning server. The measurements may be used at the positioning server or the wireless device 404 to determine the RTT, which may be used to estimate the location of the wireless device 404. Other methods are possible for determining the RTT, such as for example using time-difference of arrival (TDOA) measurements, such as DL-TDOA and/or UL-TDOA measurements.

DL-AoD positioning may make use of the measured PRS-RSRP of signals transmitted from multiple wireless devices, such as the wireless device 402 and the wireless device 406, and received at the wireless device 404. The AoD positioning may also be referred to as DL-AoD positioning where the PRS are DL signals. The wireless device 404 may measure the PRS-RSRP of the received signals using assistance data received from the positioning server, and the resulting measurements may be used along with the azimuth angle of departure (A-AoD), the zenith angle of departure (Z-AoD), and other configuration information to locate the wireless device 404 in relation to the neighboring wireless devices that transmitted the PRS, such as the wireless device 402 and the wireless device 406.

DL-TDOA positioning may make use of the DL reference signal time difference (RSTD), and/or PRS-RSRP of signals received from multiple wireless devices, such as the wireless device 402 and the wireless device 406, at the wireless device 404. The wireless device 404 may measure the RSTD, and/or the PRS-RSRP, of the received PRS signals using assistance data received from the positioning server, and the resulting measurements may be used along with other configuration information to locate the wireless device 404 in relation to the neighboring wireless devices that transmitted the PRS, such as the wireless device 402 and the wireless device 406.

UL-TDOA positioning may make use of the UL relative time of arrival (RTOA), and/or SRS-RSRP, at multiple wireless devices, such as the wireless device 402 and the wireless device 406, of signals transmitted from the wireless device 404. The wireless devices, such as the wireless device 402 and the wireless device 406, may measure the RTOA, and/or the SRS-RSRP, of the received signals using assistance data received from the positioning server, and the resulting measurements may be used along with other configuration information to estimate the location of the wireless device 404.

UL-AoA positioning may make use of the measured azimuth angle of arrival (A-AoA) and zenith angle of arrival (Z-AoA) at multiple wireless devices, such as the wireless device 402 and the wireless device 406, of signals transmitted from the wireless device 404. The wireless device 402 and the wireless device 406 may measure the A-AoA and the Z-AoA of the received signals using assistance data received from the positioning server, and the resulting measurements may be used along with other configuration information to estimate the location of the wireless device 404.

Additional positioning methods may be used for estimating the location of the wireless device 404, such as for example, UL-AoD and/or DL-AoA at the wireless device 404. Note that data/measurements from various technologies may be combined in various ways to increase accuracy, to determine and/or to enhance certainty, to supplement/complement measurements, and/or to substitute/provide for missing information.

While the wireless device 404 may be configured to perform positioning with the wireless device 402 and the wireless device 406, and the wireless device 402 and the wireless device 406 may be configured to perform positioning with the wireless device 404, such wireless devices may not be configured to perform positioning with other devices. For example, the wireless device 404 may not be configured to perform positioning with other UEs, TRPs, and/or PRUs, and the wireless device 402 and the wireless device 406 may not be configured to perform positioning with other UEs, TRPs, and/or PRUs. Moreover, the wireless device 404, the wireless device 402, and the wireless device 406 may not be configured to share intermediate data or positioning model training labels with other entities for security reasons, or to save on bandwidth. However, sharing such data may be useful to train positioning models. For example, PRS and SRS measurements, such as channel impulse response (CIR) measurements, relative time of arrival (RTOA) measurements, UL angle-of-arrival (UL-AoA) measurements, DL angle-of-departure (DL-AoD) measurements, receive (Rx) transmit (Tx) (Rx-Tx) time difference measurements, reference signal time difference (RSTD) measurements, reference signal received power (RSRP) measurements, line-of-sight (LOS) identification measurements, and/or non-line-of-sight (NLOS) identification measurements may be used to train a positioning model to calculate a target location of a UE. A LOS identification may include an indication that there exists a LOS path between a transmitting antenna of one wireless device and receiving antenna of another wireless device. A NLOS identification may include an indication that a LOS path does not exist between a transmitting antenna of one wireless device and a receiving antenna of another wireless device. Such measurements may include hard measurements, such as an absolute measurement value, or soft measurements, such as a probability measurement value (e.g., the likeness that a measurement will be a value expressed as a percentage), a variance measurement value (e.g., the minimum estimated measurement value and the maximum estimated measurement value), and/or a distribution measurement value (e.g., a series of probabilities of values expressed over a variance spread between a minimum and a maximum estimated measurement value). One or more of such measurements may be used to train a positioning model to calculate an intermediate measurement (e.g., a timing, an angle, or a LOS identification), which may be used to calculate a target location of a UE using a non-AI method, for example by using a Chans algorithm or a Kalman Filter (KF) algorithm. The training data may include reference signal measurements, calculated labels (both clean and noisy labels, in some embodiments with probabilities associated with the labels), and/or training data assistance information (e.g., bandwidth part (BWP), number of TRPs, beam information, PRS configurations, or SRS configurations).

Figure 5:
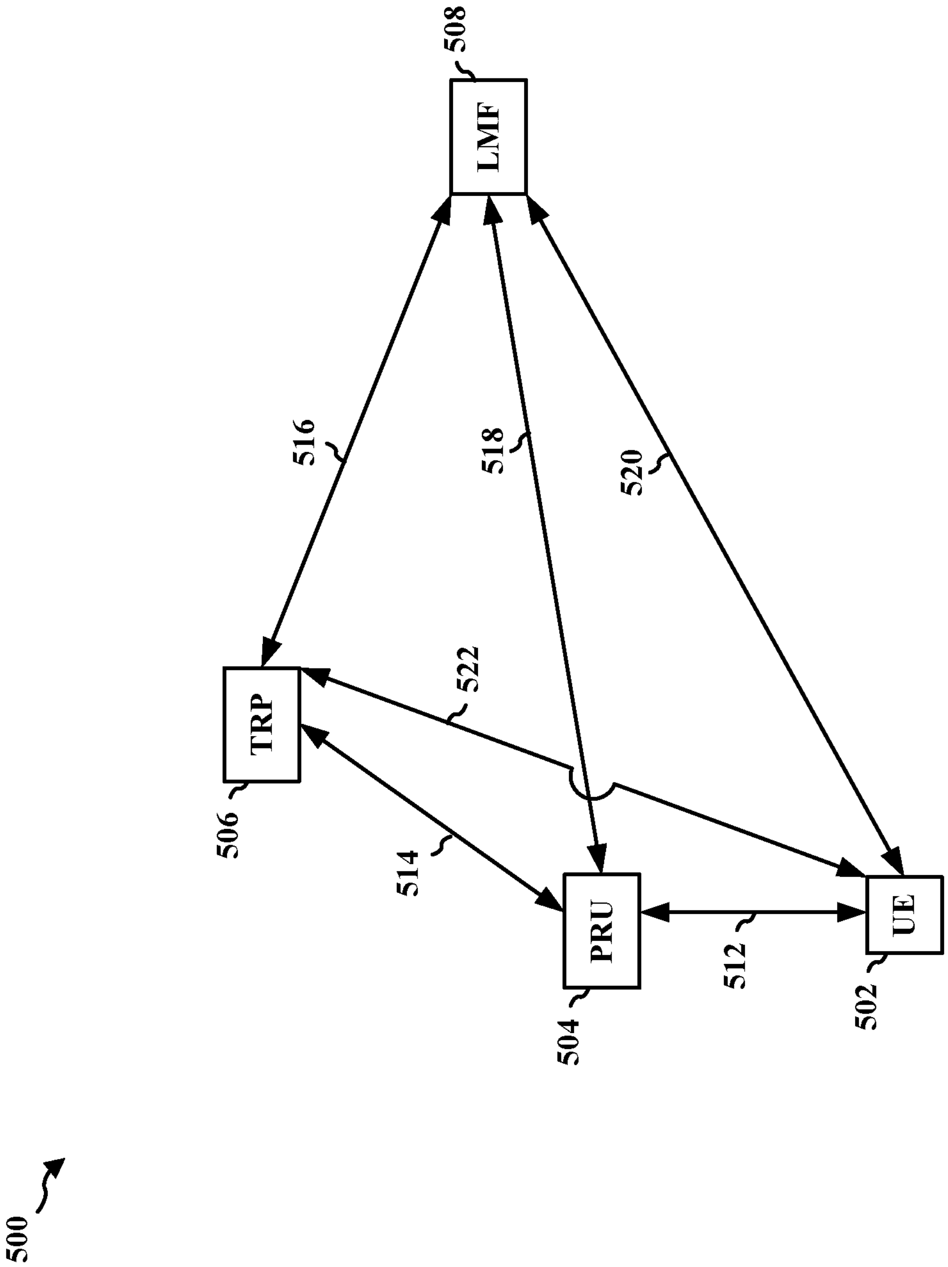
FIG. 5 is a diagram illustrating an example of a positioning reference unit (PRU) configured to communicate positioning signals with a transmission reception point (TRP), a UE, and a location management function (LMF).

FIG. 5 is a diagram 500 illustrating an example of a PRU 504 configured to communicate positioning signals with a TRP 506, a UE 502, and a LMF 508. The PRU 504 may be configured to mimic a UE when communicating with the TRP 506, and may be configured to mimic a TRP 506 when communicating with the UE 502. In other words, the PRU 504 may be configured to mimic a UE when performing positioning with the TRP 506 via the signals 514, and the PRU 504 may be configured to mimic a TRP when performing positioning with the UE 502 via the signals 512. In other words, the PRU 504 may be configured to transmit a set of SRSs to the TRP 506, and may be configured to receive and measure a set of PRSs from the TRP 506. The PRU 504 may also be configured to transmit a set of PRSs to the UE 502, and may be configured to receive and measure a set of SRSs from the UE 502. The UE 502 and the TRP 506 may be configured to perform positioning with one another via the signals 522. The LMF 508 may be configured to coordinate positioning with the UE via the signals 520, coordinate positioning with the PRU via the signals 518, and coordinate positioning with the TRP via the signals 516. The UE 502 may be configured to share positioning reports with the LMF 508 via the LPPa protocol. The TRP may be configured to share positioning reports with the LMF 508 via the NRPPa protocol. The PRU 504 may be configured to share positioning reports with the LMF 508 using either the LPPa protocol, or the NRPPa protocol, as appropriate. For example, the PRU 504 may be configured to share positioning reports based on SRS measurements with the LMF 508 via the NRPPa protocol, and may be configured to share positioning reports based on PRS measurements with the LMF 508 via the LPPa protocol.

While one TRP, one PRU, and one UE are shown in diagram 500, a plurality of TRPs, a plurality of PRUs, and/or a plurality of UEs may be configured to perform positioning with one another in other aspects of the present disclosure. For example, the UE 502 may be configured to perform positioning with a plurality of TRPs and the PRU 504, with a plurality of PRUs and the TRP 506, with a plurality of TRPs and a plurality of PRUs, with the TRP 506, with the PRU 504, or with both the TRP 506 and the PRU 504. In another example, the TRP 506 may be configured to perform positioning with a plurality of UEs and the PRU 504, with a plurality of PRUs and the UE 502, with a plurality of UEs and a plurality of PRUs, with the UE 502, with the PRU 504, or with both the UE 502 and the PRU 504. In another example, the PRU 504 may be configured to perform positioning with a plurality of TRPs and the UE 502, a plurality of UEs and the TRP 506, a plurality of TRPs and a plurality of UEs, the UE 502, the TRP 506, or the UE 502 and the TRP 506. One or more of the aforementioned UEs may be a PRU configured to emulate a UE. A plurality of UEs may include a plurality of UEs, a plurality of PRUs configured to emulate UEs, a UE and a PRU configured to emulate a UE, a UE and a plurality of PRUs configured to emulate UEs, or a plurality of UEs and a PRU configured to emulate a UE. One or more of the aforementioned TRPs may be a PRU configured to emulate a TRP. A plurality of TRPs may include a plurality of TRPs, a plurality of PRUs configured to emulate TRPs, a TRP and a PRU configured to emulate a TRP, a TRP and a plurality of PRUs configured to emulate TRPs, or a plurality of TRPs and a PRU configured to emulate a TRP.

Figure 6:
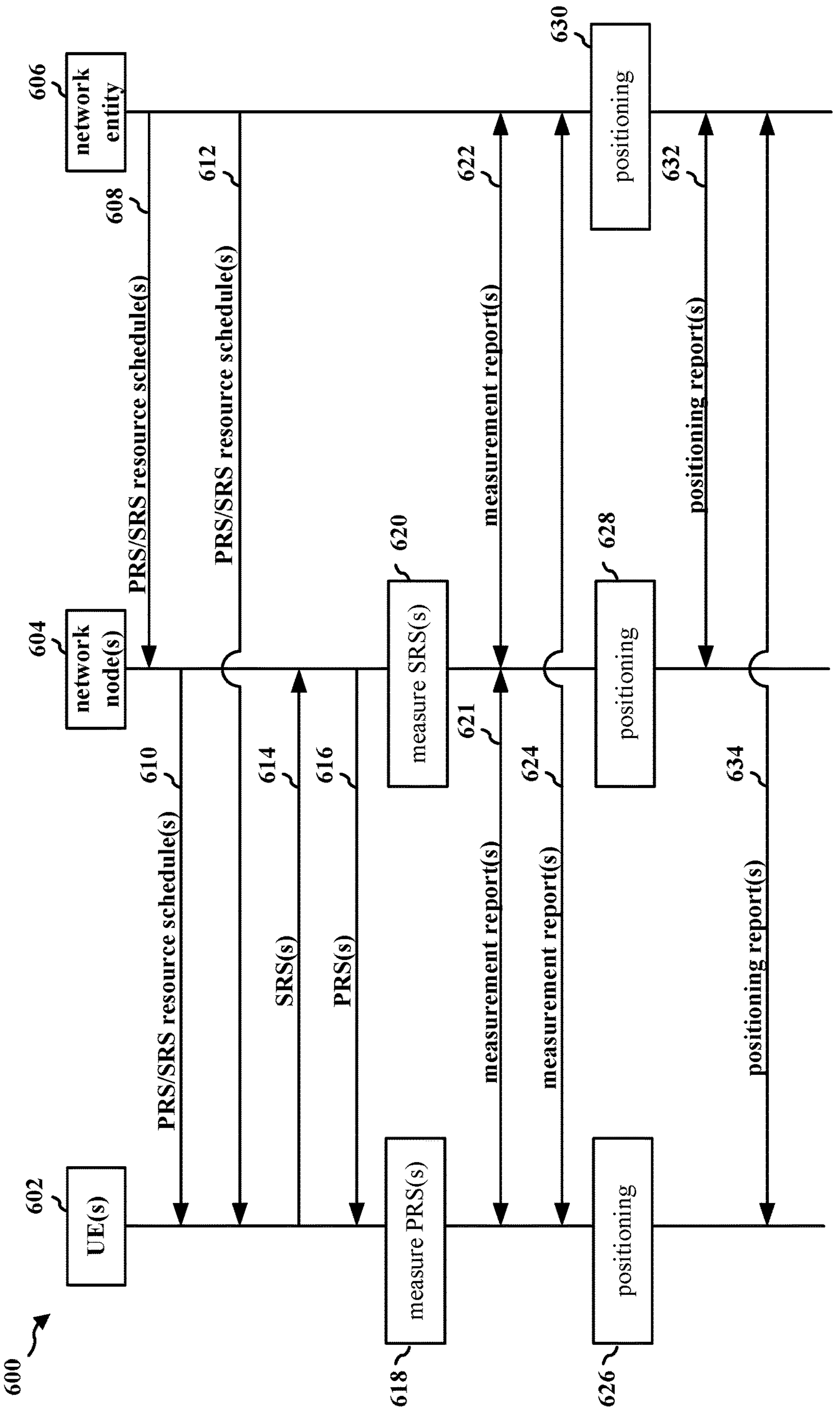
FIG. 6 is a connection flow diagram illustrating an example of a set of UEs and a set of network nodes configured to perform positioning, in accordance with various aspects of the present disclosure.

FIG. 6 is a connection flow diagram 600 illustrating an example of a set of UEs 602 and a set of network nodes 604 configured to perform positioning with one another. In some aspects, a network entity 606 may be configured to coordinate positioning between the set of UEs 602 and the set of network nodes 604. For example, the network entity 606 may be a positioning server or may be a location management function (LMF). In other aspects, one of the set of network nodes 604 may be configured to coordinate positioning between the set of UEs 602 and the set of network nodes 604. The coordinating network node of the set of network nodes 604 may transmit a set of PRS/SRS resource schedules 610 to the set of UEs 602. The set of UEs 602 may receive the set of PRS/SRS resource schedules 610.

The network entity 606 may transmit a set of PRS/SRS resource schedules 608 to the set of network nodes 604. The set of network nodes 604 may receive the set of PRS/SRS resource schedules 608. The network entity 606 may transmit a set of PRS/SRS resource schedules 612 to the set of UEs 602. The set of UEs may receive set of PRS/SRS resource schedules 612 from the network entity 606. In other words, the network entity 606 may directly configure transmission and reception of DL and UL resources, respectively, at the set of UEs 602 and/or at the set of network nodes 604. In some aspects, the network entity 606 may configure transmission and reception of DL and UL resources in response to obtaining proper confirmation from a network node, for example a network node coordinating the positioning or a network node that serves at least one of the set of UEs 602.

In some aspects, the network entity 606 may configure and request resources for positioning between the set of UEs 602 and the set of network nodes 604. The network entity 606 may request a network node of the set of network nodes 604 (e.g., an existing gNB or an NG-RAN node) to configure a gap for the set of UEs 602 to transmit the set of SRSs 614, and/or for the set of network nodes 604 to transmit the set of PRSs 616. The network entity 606 may transmit the request as the set of PRS/SRS resource schedules 608, which may include an indication for the network node to directly configure transmission and reception of UL and DL resources at the set of UEs 602. In some aspects, the indication may indicate for the network node to directly configure transmission and reception of UL and DL resources at other network nodes of the set of network nodes 604. The network node of the set of network nodes 604 may directly configure transmission and reception of DL and UL resources, respectively, at the set of UEs 602 and/or, in some aspects, other network nodes of the set of network nodes 604. The network node may transmit the set of PRS/SRS resource schedules 610 to the set of UEs 602.

The set of PRS/SRS resource schedules 610 and/or the set of PRS/SRS resource schedules 612 may indicate to the set of UEs 602 when the set of UEs 602 are to transmit the set of SRSs 614 to the set of network nodes 604. The set of PRS/SRS resource schedules 610 and/or the set of PRS/SRS resource schedules 612 may indicate to the set of UEs 602 when the set of UEs 602 are to receive the set of PRSs 616 from the set of network nodes 604 for measurement. The set of PRS/SRS resource schedules 608 may indicate to the set of network nodes 604 when the set of network nodes 604 are to transmit the set of PRSs 616 to the set of UEs 602. The set of PRS/SRS resource schedules 608 may indicate to the set of network nodes 604 when the set of network nodes 604 are to receive the set of SRSs 614 from the set of UEs 602 for measurement.

The set of UEs 602 may transmit the set of SRSs 614 to the set of network nodes 604. The set of network nodes 604 may receive the set of SRSs 614 from the set of UEs 602. At 620, the set of network nodes 604 may measure the set of SRSs 614 for a set of UL positioning measurements. The UL positioning measurements may include, for example, hard or soft measurements of (a) an RTOA measurement, (b) an UL-AoA measurement, (c) an Rx-Tx time difference measurement, (d) an RSTD measurement, (e) an RSRP measurement, (f) an LOS identification measurement, or (g) an NLOS identification measurement. In some aspects, a network node of the set of network nodes 604 may have one LOS component. Thus, identifying one LOS component may imply that the other components are NLOS. In other aspects, a network node may report multiple paths and assign a LOS probability for each path based on the measurements. The set of network nodes 604 may transmit the set of PRSs 616 to the set of UEs 602. The set of UEs 602 may receive the set of PRSs 616 from the set of network nodes 604. At 618, the set of UEs 602 may measure the set of PRSs 616 for a set of DL positioning measurements. The measurements may include, for example, hard or soft measurements of (a) an RSTD measurement, (b) an RSRP measurement, (c) an Rx-Tx time difference measurement, (d) an LOS identification measurement, (e) an NLOS identification measurement, (f) an RTOA measurement, or (g) a DL-AoD measurement. In some aspects, a UE of the set of UEs 602 may have one LOS component. Thus, identifying one LOS component may imply that the other components are NLOS. In other aspects, a network node may report multiple paths and assign a LOS probability for each path based on the measurements.

The set of network nodes 604 and the set of UEs 602 may share a set of measurement reports 621 with one another. For example, the set of UEs 602 may transmit the set of measurement reports 621 to the set of network nodes 604 based on the measured set of PRSs measured at 618. The set of measurement reports 621 may include one or more DL positioning measurements, such as hard or soft measurements of (a) an RSTD measurement, (b) an RSRP measurement, (c) an Rx-Tx time difference measurement, (d) an LOS identification measurement, (e) an NLOS identification measurement, (f) an RTOA measurement, or (g) a DL-AoD measurement. The set of network nodes 604 may receive the set of measurement reports 621 from the set of UEs 602. In another example, the set of network nodes 604 may transmit the set of measurement reports 621 to the set of UEs 602 based on the measured set of SRSs measured at 620. The set of measurement reports 621 may include one or more UL positioning measurements, such as hard or soft measurements of (a) an RTOA measurement, (b) an UL-AoA measurement, (c) an Rx-Tx time difference measurement, (d) an RSTD measurement, (e) an RSRP measurement, (f) an LOS identification measurement, or (g) an NLOS identification measurement. The UEs 602 may receive the set of measurement reports 621 from the set of network nodes 604.

The set of network nodes 604 and the network entity 606 may share a set of measurement reports 622 with one another. For example, the set of network nodes 604 may transmit the set of measurement reports 622 to the network entity 606 based on the measured set of SRSs measured at 620. The network entity 606 may receive the set of measurement reports 622 from the set of network nodes 604. In another example, the network entity 606 may transmit the set of measurement reports 622 to the set of network nodes 604 based on other measured SRSs from other network nodes, for example as part of a multi-round trip time (multi-RTT) measurement. The set of network nodes 604 may receive the set of measurement reports 622 from the network entity 606. The set of measurement reports 622 may be shared using NRPPa messages.

The set of UEs 602 and the network entity 606 may share a set of measurement reports 624 with one another. For example, the set of UEs 602 may transmit the set of measurement reports 624 to the network entity 606 based on the measured set of PRSs measured at 618. The network entity 606 may receive the set of measurement reports 624 from the set of UEs 602. In another example, the network entity 606 may transmit the set of measurement reports 624 to the set of UEs 602 based on other measured PRSs from other UEs, for example as part of a multi-round trip time (multi-RTT) measurement. The set of UEs 602 may receive the set of measurement reports 624 from the network entity 606. The set of measurement reports 624 may be shared using LPPa messages.

At 626, the set of UEs 602 may perform positioning based on the set of measurement reports 624 and the measured set of PRSs at 618. The set of UEs 602 may share its positioning reports generated at 626 with the network entity 606 as the positioning reports 634. The set of positioning reports 634 may be shared using LPPa messages.

At 628, the set of network nodes 604 may perform positioning based on the set of measurement reports 622 and the measured set of SRSs at 620. The set of network nodes 604 may share its positioning reports generated at 628 with the network entity 606 as the positioning reports 632. The set of positioning reports 632 may be shared using NRPPa messages.

At 630, the network entity 606 may perform positioning based on the set of measurement reports 622, the set of measurement reports 624, and any other positioning reports the network entity 606 may receive from other wireless devices. The network entity 606 may share its positioning reports generated at 630 with the set of network nodes 604 as the positioning reports 632 and/or may share its positioning reports generated at 630 with the set of UEs 602 as the positioning reports 634. The set of positioning reports 634 may be shared using LPPa messages. The set of positioning reports 632 may be shared using NRPPa messages.

Figure 7:
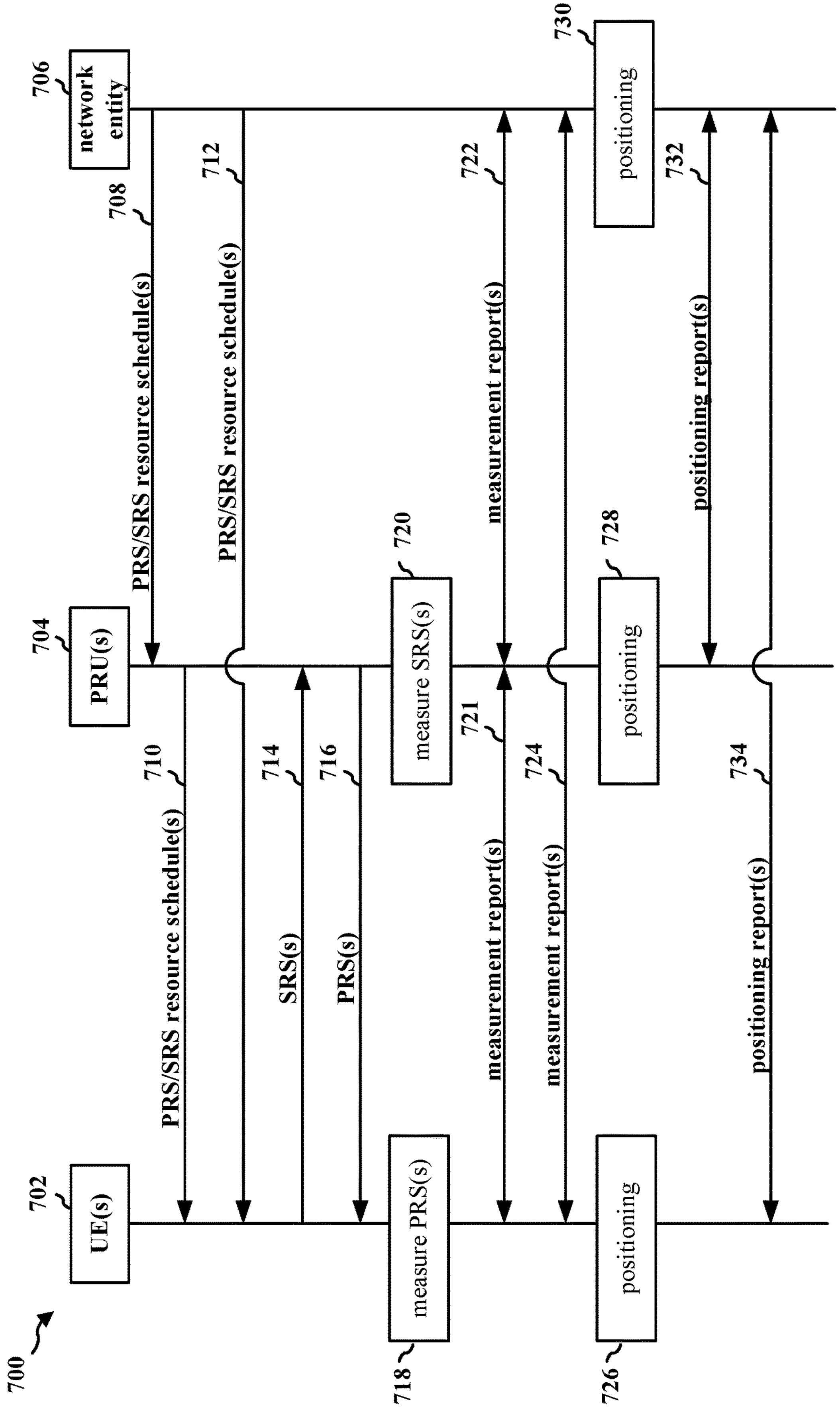
FIG. 7 is a connection flow diagram illustrating an example of a set of UEs and a set of PRUs configured to perform positioning, in accordance with various aspects of the present disclosure.

FIG. 7 is a connection flow diagram 700 illustrating an example of a set of UEs 702 and a set of PRUs 704 configured to perform positioning with one another. In some aspects, a PRU may be realized by a UE with a known location. In some aspects, a PRU may be realized by a mobile TRP with a known location. In some aspects, the set of UEs 702 may include a PRU configured to emulate a UE during positioning. The set of UEs 702 and/or the network entity 706 may know the location of any of the PRUs of the set of PRUs 704 or the set of UEs 702. In some aspects, a PRU may calculate its location using positioning, or using other positioning methods (e.g., a GNSS fix or by traveling to a known location at a prearranged time) and may transmit its location to the network entity 706, which may update other wireless devices, such as the set of UEs 702, of the location of the PRU. In other aspects, the PRU may broadcast its calculated location to other wireless devices, such as the set of UEs 702. In other aspects, the network entity 706 may perform positioning on a PRU, and may then update other wireless devices, such as the set of UEs 702, of the location of the PRU.

In some aspects, a network entity 706 may be configured to coordinate positioning between the set of UEs 702 and the set of PRUs 704. For example, the network entity 706 may be a positioning server or may be a location management function (LMF). In other aspects, one of the set of PRUs 704 may be configured to coordinate positioning between the set of UEs 702 and the set of PRUs 704. The coordinating PRU of the set of PRUs 704 may transmit a set of PRS/SRS resource schedules 710 to the set of UEs 702. The set of UEs 702 may receive the set of PRS/SRS resource schedules 710.

The network entity 706 may transmit a set of PRS/SRS resource schedules 708 to the set of PRUs 704. The set of PRUs 704 may receive the set of PRS/SRS resource schedules 708. In other words, the network entity 706 may directly configure transmission and reception of DL and UL resources, respectively, at the set of PRUs 704. In some aspects, the network entity 706 may configure the set of PRS/SRS resource schedules 708 in response to obtaining proper confirmation with an NG-RAN node serving a PRU of the set of PRUs 704, for example via NRPPa configurations with the PRU. The network entity 706 may transmit a set of PRS/SRS resource schedules 712 to the set of UEs 702. The set of UEs may receive set of PRS/SRS resource schedules 712 from the network entity 706. In other words, the network entity 706 may directly configure transmission and reception of DL and UL resources, respectively, at the set of UEs 702 and/or at the set of PRUs 704. In some aspects, the network entity 706 may configure transmission and reception of DL and UL resources in response to obtaining proper confirmation from a network node, for example a network node coordinating the positioning or a network node that serves at least one of the set of UEs 702.

In some aspects, the network entity 706 may configure and request resources for positioning between the set of UEs 702 and the set of PRUs 704. The network entity 706 may request a PRU of the set of PRUs 704 (e.g., an existing gNB or an NG-RAN node) to configure a gap for the set of UEs 702 to transmit the set of SRSs 714, and/or for the set of PRUs 704 to transmit the set of PRSs 716. The network entity 706 may transmit the request as the set of PRS/SRS resource schedules 708, which may include an indication for the network node to directly configure transmission and reception of UL and DL resources at the set of UEs 702. In some aspects, the indication may indicate for the PRU to directly configure transmission and reception of UL and DL resources at other PRUs of the set of PRUs 704 configured to emulate a network node. The PRU of the set of PRUs 704 may directly configure transmission and reception of DL and UL resources, respectively, at the set of UEs 702 and/or, in some aspects, other PRUs of the set of PRUs 704 that are configured to emulate a network node. The network node may be an NG-RAN node serving the other PRUs of the set of PRUs 704. The network node may directly configure transmission and reception of DL and UL resources, respectively, at the set of PRUs 704 through RRC configurations with the set of PRUs 704. The network node may transmit the set of PRS/SRS resource schedules 710 to the set of UEs 702.

The set of PRS/SRS resource schedules 710 and/or the set of PRS/SRS resource schedules 712 may indicate to the set of UEs 702 when the set of UEs 702 are to transmit the set of SRSs 714 to the set of PRUs 704. The set of PRS/SRS resource schedules 710 and/or the set of PRS/SRS resource schedules 712 may indicate to the set of UEs 702 when the set of UEs 702 are to receive the set of PRSs 716 from the set of PRUs 704 for measurement. The set of PRS/SRS resource schedules 708 may indicate to the set of PRUs 704 when the set of PRUs 704 are to transmit the set of PRSs 716 to the set of UEs 702. The set of PRS/SRS resource schedules 708 may indicate to the set of PRUs 704 when the set of PRUs 704 are to receive the set of SRSs 714 from the set of UEs 702 for measurement.

In some aspects, the network entity 706 may configure a gap for the set of PRUs 704 to send PRS resources, such as the set of PRSs 716, and/or to receive SRS resources, such as the set of SRSs 714. In some aspects, the network entity 706 may request another network node (e.g., an existing gNB, an NG-RAN node serving one of the set of PRUs 704) to configure the gap for at least one of the set of PRUs 704 to send PRS resources and/or to receive SRS resources. The other network node may directly configure transmission and reception of DL and UL resources, respectively, at the PRU (e.g., through RRC configurations with the PRU), or the network entity 706 may directly configure transmission and reception of DL and UL resources, respectively, at the PRU after obtaining proper confirmation from the other network node (e.g., through NRPPa configurations with the PRU).

The set of UEs 702 may transmit the set of SRSs 714 to the set of PRUs 704. The set of PRUs 704 may receive the set of SRSs 714 from the set of UEs 702. At 720, the set of PRUs 704 may measure the set of SRSs 714 for a set of UL positioning measurements. Each of the set of PRUs 704 may perform UL positioning measurements based on the set of SRSs 714 from the set of UEs 702, which may include one or more PRUs. The set of PRUs 704 may receive the set of SRSs 714 to perform UL positioning measurements. The UL positioning measurements may include, for example, hard or soft measurements of (a) an RTOA measurement, (b) an UL-AoA measurement, (c) an Rx-Tx time difference measurement, (d) an RSTD measurement, (e) an RSRP measurement, (f) an LOS identification measurement, or (g) an NLOS identification measurement. In some aspects, a PRU of the set of PRUs 704 may have one LOS component. Thus, identifying one LOS component may imply that the other components are NLOS. In other aspects, a network node may report multiple paths and assign a LOS probability for each path based on the measurements.

The set of PRUs 704 may transmit the set of PRSs 716 to the set of UEs 702. The set of UEs 702 may receive the set of PRSs 716 from the set of PRUs 704. This enables the set of UEs 702, which may include one or more PRUs, to perform DL positioning measurements. At 718, the set of UEs 702 may measure the set of PRSs 716 for a set of DL positioning measurements. The measurements may include, for example, hard or soft measurements of (a) an RSTD measurement, (b) an RSRP measurement, (c) an Rx-Tx time difference measurement, (d) an LOS identification measurement, (e) an NLOS identification measurement, (f) an RTOA measurement, or (g) a DL-AoD measurement. In some aspects, a UE of the set of UEs 702 may have one LOS component. Thus, identifying one LOS component may imply that the other components are NLOS. In other aspects, a network node may report multiple paths and assign a LOS probability for each path based on the measurements.

The set of PRUs 704 and the set of UEs 702 may share a set of measurement reports 721 with one another. For example, the set of UEs 702 may transmit the set of measurement reports 721 to the set of PRUs 704 based on the measured set of PRSs measured at 718. The set of measurement reports 721 may include one or more DL positioning measurements, such as hard or soft measurements of (a) an RSTD measurement, (b) an RSRP measurement, (c) an Rx-Tx time difference measurement, (d) an LOS identification measurement, (e) an NLOS identification measurement, (f) an RTOA measurement, or (g) a DL-AoD measurement. The set of PRUs 704 may receive the set of measurement reports 721 from the set of UEs 702. In another example, the set of PRUs 704 may transmit the set of measurement reports 721 to the set of UEs 702 based on the measured set of SRSs measured at 720. The set of measurement reports 721 may include one or more UL positioning measurements, such as hard or soft measurements of (a) an RTOA measurement, (b) an UL-AoA measurement, (c) an Rx-Tx time difference measurement, (d) an RSTD measurement, (e) an RSRP measurement, (f) an LOS identification measurement, or (g) an NLOS identification measurement. The set of UEs 702 may receive the set of measurement reports 721 from the set of PRUs 704. Any of the set of UEs 702 may use the reported measurements at the known location of the set of PRUs 704 to determine and/or enhance labels for training a positioning model.

The set of PRUs 704 and the network entity 706 may share a set of measurement reports 722 with one another. For example, the set of PRUs 704 may transmit the set of measurement reports 722 to the network entity 706 based on the measured set of SRSs measured at 720. The set of PRUs 704 may transmit the set of measurement reports 722 in an NRPPa message, emulating an NG-RAN node. The network entity 706 may receive the set of measurement reports 722 from the set of PRUs 704. The network entity 706 may use the reported measurements at the known location of the set of PRUs 704 to determine and/or enhance labels for training a positioning model. In another example, the network entity 706 may transmit the set of measurement reports 722 to the set of PRUs 704 based on other measured SRSs from other network nodes, for example as part of a multi-round trip time (multi-RTT) measurement. The set of PRUs 704 may receive the set of measurement reports 722 from the network entity 706. The set of measurement reports 722 may be shared using NRPPa messages.

The set of UEs 702 and the network entity 706 may share a set of measurement reports 724 with one another. For example, the set of UEs 702 may transmit the set of measurement reports 724 to the network entity 706 based on the measured set of PRSs measured at 718. The network entity 706 may receive the set of measurement reports 724 from the set of UEs 702. In another example, the network entity 706 may transmit the set of measurement reports 724 to the set of UEs 702 based on other measured PRSs from other UEs, for example as part of a multi-round trip time (multi-RTT) measurement. The set of UEs 702 may receive the set of measurement reports 724 from the network entity 706. The set of measurement reports 724 may be shared using LPPa messages.

At 726, the set of UEs 702 may perform positioning based on the set of measurement reports 724 and the measured set of PRSs at 718. The set of UEs 702 may share its positioning reports generated at 726 with the network entity 706 as the positioning reports 734. The set of positioning reports 734 may be shared using LPPa messages.

At 728, the set of PRUs 704 may perform positioning based on the set of measurement reports 722 and the measured set of SRSs at 720. The set of PRUs 704 may conduct NG-RAN positioning methods, for example calculating a position of any of the set of UEs 702 based on a set of measured UL-TDoA, a set of measured UL-AoA, or a set of multi-RTT. The set of PRUs 704 may share its positioning reports generated at 728 with the network entity 706 as the positioning reports 732. The set of PRUs 704 may transmit the set of positioning reports 732 in an NRPPa message, emulating an NG-RAN node. The network entity 706 may view the set of PRUs 704 as a set of NG-RAN nodes with known locations.

At 730, the network entity 706 may perform positioning based on the set of measurement reports 722, the set of measurement reports 724, and any other positioning reports the network entity 706 may receive from other wireless devices. The network entity 706 may share its positioning reports generated at 730 with the set of PRUs 704 as the positioning reports 732 and/or may share its positioning reports generated at 730 with the set of UEs 702 as the positioning reports 734. The set of positioning reports 734 may be shared using LPPa messages. The set of positioning reports 732 may be shared using NRPPa messages.

Figure 8:
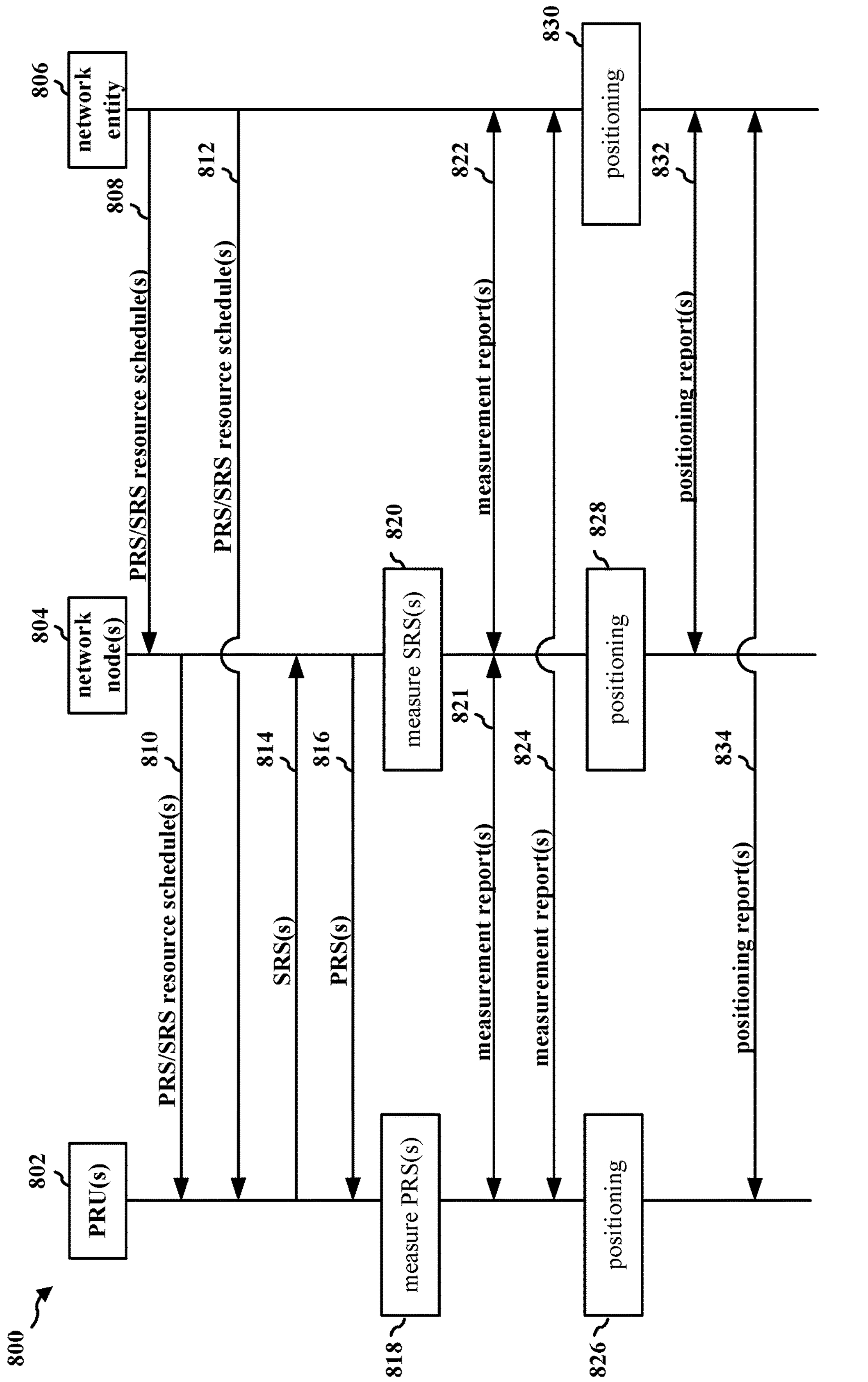
FIG. 8 is a connection flow diagram illustrating an example of a set of network nodes and a set of PRUs configured to perform positioning, in accordance with various aspects of the present disclosure.

FIG. 8 is a connection flow diagram 800 illustrating an example of a set of PRUs 802 and a set of network nodes 804 configured to perform positioning with one another. In some aspects, a PRU may be realized by a UE with a known location. In some aspects, a PRU may be realized by a mobile TRP with a known location. In some aspects, the set of network nodes 804 may include a PRU configured to emulate a network node during positioning. The set of network nodes 804 and/or the network entity 706 may know the location of any of the PRUs of the set of PRUs 802 or the set of network nodes 804. In some aspects, a PRU may calculate its location using positioning, or using other positioning methods (e.g., a GNSS fix or by traveling to a known location at a prearranged time) and may transmit its location to the network entity 806, which may update other wireless devices, such as the set of network nodes 804, of the location of the PRU. In other aspects, the network entity 806 may perform positioning on a PRU, and may then update other wireless devices, such as the set of network nodes 804, of the location of the PRU.

In some aspects, a network entity 806 may be configured to coordinate positioning between the set of PRUs 802 and the set of network nodes 804. For example, the network entity 806 may be a positioning server or may be a location management function (LMF). In other aspects, one of the set of network nodes 804 may be configured to coordinate positioning between the set of PRUs 802 and the set of network nodes 804. The coordinating network node of the set of network nodes 804 may transmit a set of PRS/SRS resource schedules 810 to the set of PRUs 802. The set of PRUs 802 may receive the set of PRS/SRS resource schedules 810.

The network entity 806 may transmit a set of PRS/SRS resource schedules 808 to the set of network nodes 804. The set of network nodes 804 may receive the set of PRS/SRS resource schedules 808. The network entity 806 may transmit a set of PRS/SRS resource schedules 812 to the set of PRUs 802. The set of UEs may receive set of PRS/SRS resource schedules 812 from the network entity 806. In other words, the network entity 806 may directly configure transmission and reception of DL and UL resources, respectively, at the set of PRUs 802 and/or at the set of network nodes 804. In some aspects, the network entity 806 may configure transmission and reception of DL and UL resources in response to obtaining proper confirmation from a network node, for example a network node coordinating the positioning or a network node that serves at least one of the set of PRUs 802.

In some aspects, the network entity 806 may configure and request resources for positioning between the set of PRUs 802 and the set of network nodes 804. The network entity 806 may request a network node of the set of network nodes 804 (e.g., an existing gNB or an NG-RAN node) to configure a gap for the set of PRUs 802 to transmit the set of SRSs 814, and/or for the set of network nodes 804 to transmit the set of PRSs 816. The network entity 806 may transmit the request as the set of PRS/SRS resource schedules 808, which may include an indication for the network node to directly configure transmission and reception of UL and DL resources at the set of PRUs 802. In some aspects, the indication may indicate for the network node to directly configure transmission and reception of UL and DL resources at other network nodes of the set of network nodes 804. The network node of the set of network nodes 804 may directly configure transmission and reception of DL and UL resources, respectively, at the set of PRUs 802 and/or, in some aspects, other network nodes of the set of network nodes 804. The network node may transmit the set of PRS/SRS resource schedules 810 to the set of PRUs 802.

The set of PRS/SRS resource schedules 810 and/or the set of PRS/SRS resource schedules 812 may indicate to the set of PRUs 802 when the set of PRUs 802 are to transmit the set of SRSs 814 to the set of network nodes 804. The set of PRS/SRS resource schedules 810 and/or the set of PRS/SRS resource schedules 812 may indicate to the set of PRUs 802 when the set of PRUs 802 are to receive the set of PRSs 816 from the set of network nodes 804 for measurement. The set of PRS/SRS resource schedules 808 may indicate to the set of network nodes 804 when the set of network nodes 804 are to transmit the set of PRSs 816 to the set of PRUs 802. The set of PRS/SRS resource schedules 808 may indicate to the set of network nodes 804 when the set of network nodes 804 are to receive the set of SRSs 814 from the set of PRUs 802 for measurement.

In some aspects, the network entity 806 may configure a gap for the set of PRUs 802 to send SRS resources, such as the set of SRSs 814, and/or to receive PRS resources, such as the set of PRSs 816. In some aspects, the network entity 806 may request another network node (e.g., an existing gNB, an NG-RAN node serving one of the set of PRUs 802, one of the set of network nodes 804 serving one of the set of PRUs 802) to configure the gap for at least one of the set of PRUs 802 to send SRS resources and/or to receive PRS resources. The other network node may directly configure transmission and reception of DL and UL resources, respectively, at the PRU (e.g., through RRC configurations with the PRU), or the network entity 806 may directly configure transmission and reception of DL and UL resources, respectively, at the PRU after obtaining proper confirmation from the other network node (e.g., through NRPPa configurations or LPPa configurations with the PRU).

The set of PRUs 802 may transmit the set of SRSs 814 to the set of network nodes 804. The set of network nodes 804 may receive the set of SRSs 814 from the set of PRUs 802. This enables the set of network nodes 804, such as TRPs, to perform UL positioning measurements. At 820, the set of network nodes 804 may measure the set of SRSs 814 for a set of UL positioning measurements. The set of network nodes 804 may perform UL positioning measurements based on and the set of SRSs 814 received from the set of PRUs 802. The UL positioning measurements may include, for example, hard or soft measurements of (a) an RTOA measurement, (b) an UL-AoA measurement, (c) an Rx-Tx time difference measurement, (d) an RSTD measurement, (e) an RSRP measurement, (f) an LOS identification measurement, or (g) an NLOS identification measurement. In some aspects, a network node of the set of network nodes 804 may have one LOS component. Thus, identifying one LOS component may imply that the other components are NLOS. In other aspects, a network node may report multiple paths and assign a LOS probability for each path based on the measurements.

The set of network nodes 804 may transmit the set of PRSs 816 to the set of PRUs 802. The set of PRUs 802 may receive the set of PRSs 816 from the set of network nodes 804. At 818, the set of PRUs 802 may measure the set of PRSs 816 for a set of DL positioning measurements. The set of PRUs 802 may perform DL positioning measurements based on the set of PRSs 816 received from the set of network nodes 804, which may include one or more PRUs. The DL positioning measurements may include, for example, hard or soft measurements of (a) an RSTD measurement, (b) an RSRP measurement, (c) an Rx-Tx time difference measurement, (d) an LOS identification measurement, (e) an NLOS identification measurement, (f) an RTOA measurement, or (g) a DL-AoD measurement. In some aspects, a PRU of the set of PRUs 802 may have one LOS component. Thus, identifying one LOS component may imply that the other components are NLOS. In other aspects, a network node may report multiple paths and assign a LOS probability for each path based on the measurements.

The set of network nodes 804 and the set of PRUs 802 may share a set of measurement reports 821 with one another. For example, the set of PRUs 802 may transmit the set of measurement reports 821 to the set of network nodes 804 based on the measured set of PRSs measured at 818. In other words, the set of PRUs 802 may report DL positioning measurements to the set of network nodes 804 as the set of measurement reports 821. The set of measurement reports 821 may include one or more DL positioning measurements, such as hard or soft measurements of (a) an RSTD measurement, (b) an RSRP measurement, (c) an Rx-Tx time difference measurement, (d) an LOS identification measurement, (e) an NLOS identification measurement, (f) an RTOA measurement, or (g) a DL-AoD measurement. The set of network nodes 804 may receive the set of measurement reports 821 from the set of PRUs 802. Any of the set of network nodes 804 may use the reported measurements at the known location of the set of PRUs 802 to determine and/or enhance labels for training a positioning model. In another example, the set of network nodes 804 may transmit the set of measurement reports 821 to the set of PRUs 802 based on the measured set of SRSs measured at 820. The set of measurement reports 821 may include one or more UL positioning measurements, such as hard or soft measurements of (a) an RTOA measurement, (b) an UL-AoA measurement, (c) an Rx-Tx time difference measurement, (d) an RSTD measurement, (e) an RSRP measurement, (f) an LOS identification measurement, or (g) an NLOS identification measurement. The PRUs 802 may receive the set of measurement reports 821 from the set of network nodes 804.

The set of network nodes 804 and the network entity 806 may share a set of measurement reports 822 with one another. For example, the set of network nodes 804 may transmit the set of measurement reports 822 to the network entity 806 based on the measured set of SRSs measured at 820. The network entity 806 may receive the set of measurement reports 822 from the set of network nodes 804. In another example, the network entity 806 may transmit the set of measurement reports 822 to the set of network nodes 804 based on other measured SRSs from other network nodes, for example as part of a multi-round trip time (multi-RTT) measurement. The set of network nodes 804 may receive the set of measurement reports 822 from the network entity 806. The set of measurement reports 822 may be shared using NRPPa messages.

The set of PRUs 802 and the network entity 806 may share a set of measurement reports 824 with one another. For example, the set of PRUs 802 may transmit the set of measurement reports 824 to the network entity 806 based on the measured set of PRSs measured at 818. In other words, the set of PRUs 802 may report DL positioning measurements to the network entity 806 as the set of measurement reports 824. The network entity 806 may receive the set of measurement reports 824 from the set of PRUs 802. The network entity 806 may use the reported measurements at the known location of the set of PRUs 802 to determine and/or enhance labels for training a positioning model. In another example, the network entity 806 may transmit the set of measurement reports 824 to the set of PRUs 802 based on other measured PRSs from other UEs, for example as part of a multi-round trip time (multi-RTT) measurement. The set of PRUs 802 may receive the set of measurement reports 824 from the network entity 806. The set of measurement reports 824 may be shared using LPPa messages. The network entity 706 may view the set of PRUs 802 as a set of UEs with known locations.

At 826, the set of PRUs 802 may perform positioning based on the set of measurement reports 824 and the measured set of PRSs at 818. The set of PRUs 802 may share its positioning reports generated at 826 with the network entity 806 as the positioning reports 834. The set of positioning reports 834 may be shared using LPPa messages.

At 828, the set of network nodes 804 may perform positioning based on the set of measurement reports 822 and the measured set of SRSs at 820. The set of network nodes 804 may share its positioning reports generated at 828 with the network entity 806 as the positioning reports 832. The set of positioning reports 832 may be shared using NRPPa messages.

At 830, the network entity 806 may perform positioning based on the set of measurement reports 822, the set of measurement reports 824, and any other positioning reports the network entity 806 may receive from other wireless devices. The network entity 806 may share its positioning reports generated at 830 with the set of network nodes 804 as the positioning reports 832 and/or may share its positioning reports generated at 830 with the set of PRUs 802 as the positioning reports 834. The set of positioning reports 834 may be shared using LPPa messages. The set of positioning reports 832 may be shared using NRPPa messages.

Figure 9:
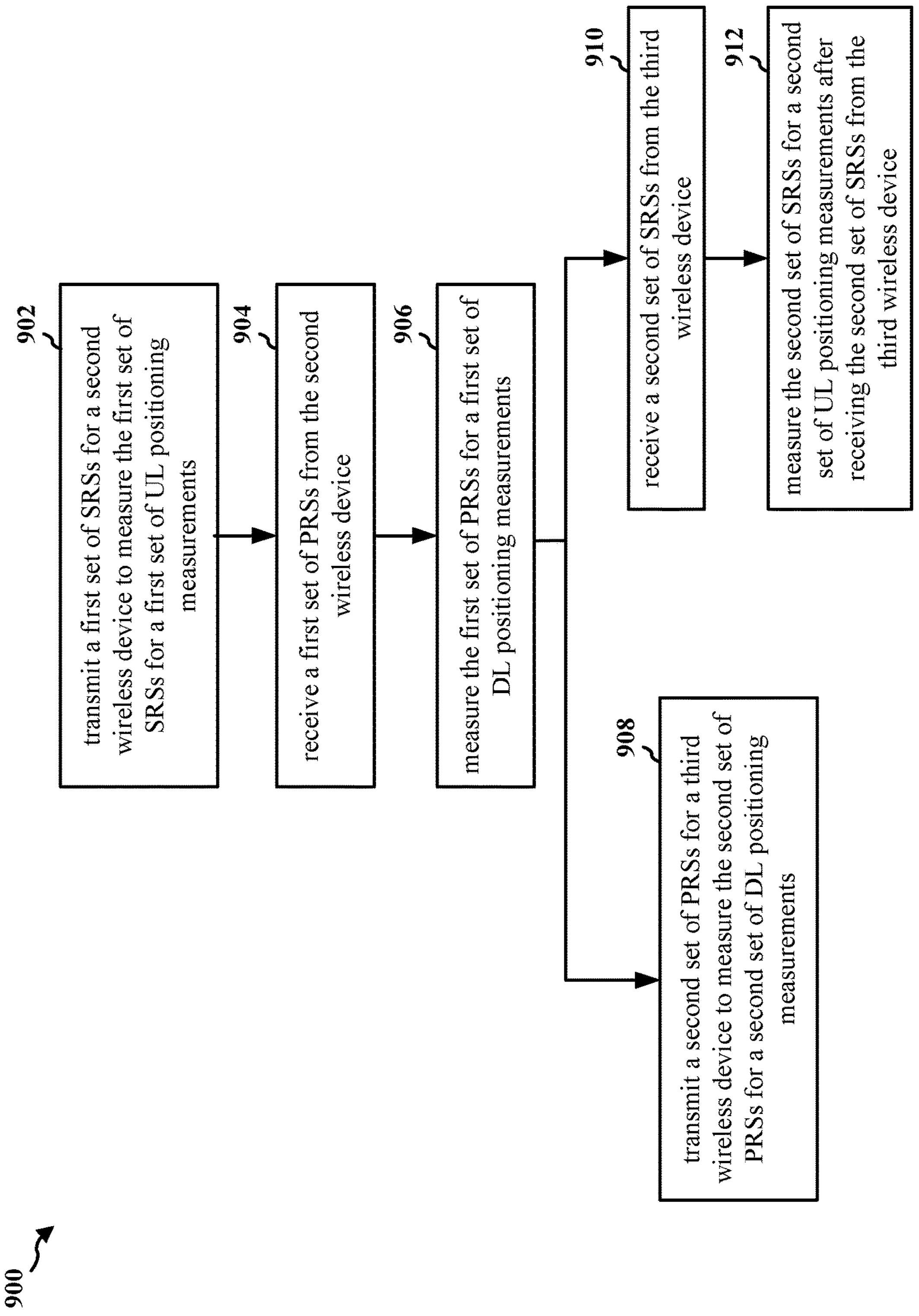
FIG. 9 is a flowchart of a method of wireless communication.

FIG. 9 is a flowchart 900 of a method of wireless communication. The method may be performed by a first wireless device (e.g., the UE 104; the UE 350, the UE 502; the wireless device 402, the wireless device 404, the wireless device 406; the set of UEs 602, the set of UEs 702; the apparatus 1304; the base station 102, the base station 310; the TRP 506; the set of network nodes 604, the set of network nodes 804; the network entity 1302, the network entity 1402, the network entity 1560; the PRU 504; the set of PRUs 704, the set of PRUs 802). At 902, the first wireless device may transmit a first set of SRSs for a second wireless device to measure the first set of SRSs for a first set of UL positioning measurements. For example, 902 may be performed by the set of PRUs 704 in FIG. 7 or the set of PRUs 802 in FIG. 8, which may transmit a first set of SRSs for a second wireless device to measure the first set of SRSs for a first set of UL positioning measurements. Moreover, 902 may be performed by the component 198 in FIGS. 1, 3, 13, 14, and 15.

At 904, the first wireless device may receive a first set of PRSs from the second wireless device. For example, 904 may be performed by the set of PRUs 704 in FIG. 7 or the set of PRUs 802 in FIG. 8, which may receive a first set of PRSs from the second wireless device. Moreover, 904 may be performed by the component 198 in FIGS. 1, 3, 13, 14, and 15.

At 906, the first wireless device may measure the first set of PRSs for a first set of DL positioning measurements. For example, 906 may be performed by the set of PRUS 704 in FIG. 7 or the set of PRUs 802 in FIG. 8, which may measure the first set of PRSs for a first set of DL positioning measurements. Moreover, 906 may be performed by the component 198 in FIGS. 1, 3, 13, 14, and 15.

At 908, the first wireless device may transmit a second set of PRSs for a third wireless device to measure the second set of PRSs for a second set of DL positioning measurements. For example, 908 may be performed by the set of PRUs 704 in FIG. 7 or the set of PRUs 802 in FIG. 8, which may transmit a second set of PRSs for a third wireless device to measure the second set of PRSs for a second set of DL positioning measurements. Moreover, 908 may be performed by the component 198 in FIGS. 1, 3, 13, 14, and 15.

At 910, the first wireless device may receive a second set of SRSs from the third wireless device. For example, 910 may be performed by the set of PRUs 704 in FIG. 7 or the set of PRUs 802 in FIG. 8, which may receive a second set of SRSs from the third wireless device. Moreover, 910 may be performed by the component 198 in FIGS. 1, 3, 13, 14, and 15.

At 912, the first wireless device may measure the second set of SRSs for a second set of UL positioning measurements after receiving the second set of SRSs from the third wireless device. For example, 912 may be performed by the set of PRUs 704 in FIG. 7 or the set of PRUs 802 in FIG. 8, which may measure the second set of SRSs for a second set of UL positioning measurements after receiving the second set of SRSs from the third wireless device. Moreover, 912 may be performed by the component 198 in FIGS. 1, 3, 13, 14, and 15.

Figure 10:
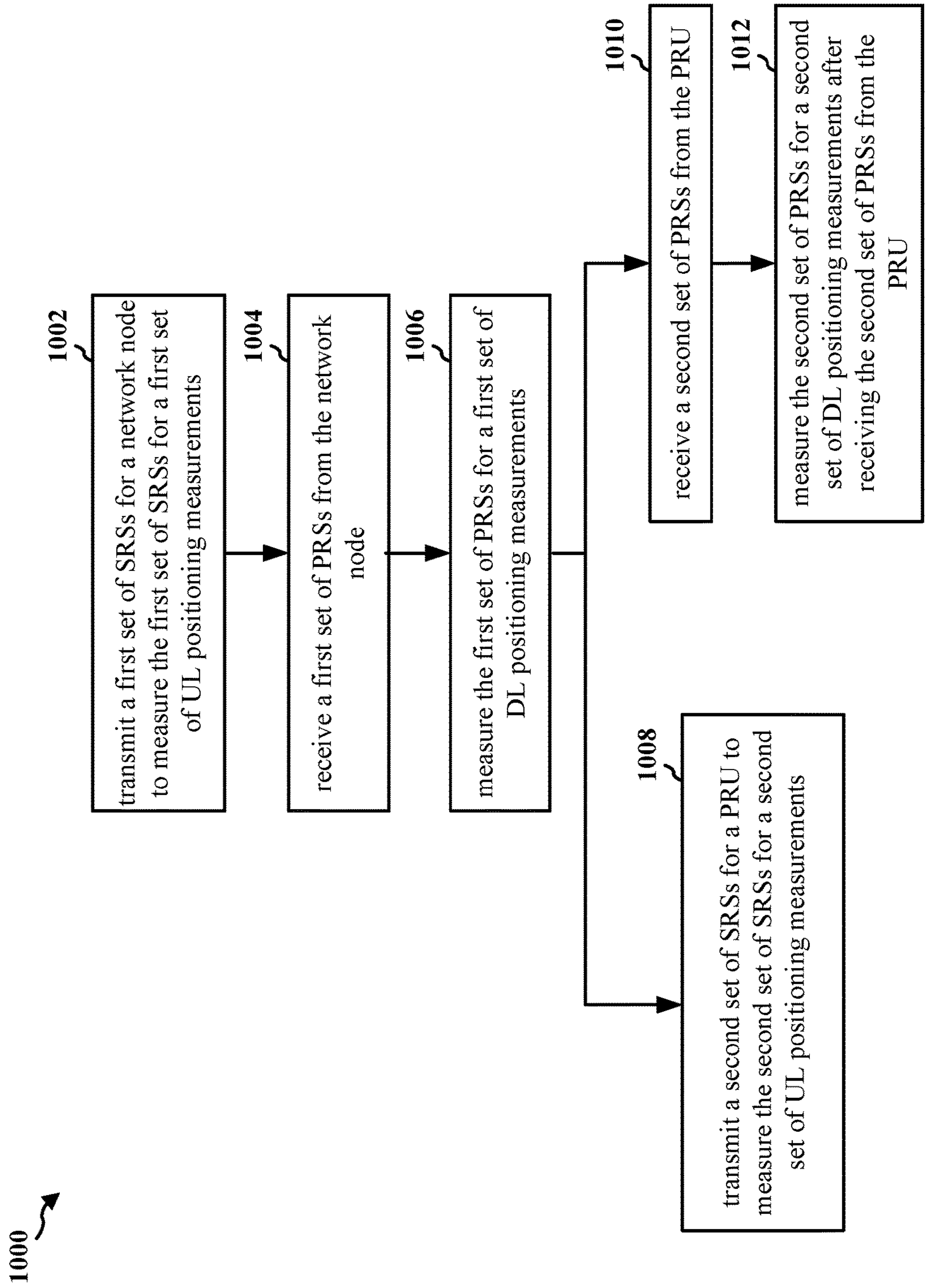
FIG. 10 is a flowchart of a method of wireless communication.

FIG. 10 is a flowchart 1000 of a method of wireless communication. The method may be performed by a UE (e.g., the UE 104; the UE 350, the UE 502; the set of UEs 602, the set of UEs 702; the apparatus 1304; the wireless device 404; the PRU 504; the set of PRUs 704, the set of PRUs 802). At 1002, the UE may transmit a first set of SRSs for a network node to measure the first set of SRSs for a first set of UL positioning measurements. For example, 1002 may be performed by the set of PRUs 704 in FIG. 7 or the set of PRUs 802 in FIG. 8, which may transmit a first set of SRSs for a network node to measure the first set of SRSs for a first set of UL positioning measurements. Moreover, 1002 may be performed by the component 198 in FIGS. 1, 3, 13, 14, and 15.

At 1004, the UE may receive a first set of PRSs from the network node. For example, 1004 may be performed by the set of PRUs 704 in FIG. 7 or the set of PRUs 802 in FIG. 8, which may receive a first set of PRSs from the network node. Moreover, 1004 may be performed by the component 198 in FIGS. 1, 3, 13, 14, and 15.

At 1006, the UE may measure the first set of PRSs for a first set of DL positioning measurements. For example, 1006 may be performed by the set of PRUs 704 in FIG. 7 or the set of PRUs 802 in FIG. 8, which may measure the first set of PRSs for a first set of DL positioning measurements. Moreover, 1006 may be performed by the component 198 in FIGS. 1, 3, 13, 14, and 15.

At 1008, the UE may transmit a second set of SRSs for a PRU to measure the second set of SRSs for a second set of UL positioning measurements. For example, 1008 may be performed by the set of PRUs 704 in FIG. 7 or the set of PRUs 802 in FIG. 8, which may transmit a second set of SRSs for a PRU to measure the second set of SRSs for a second set of UL positioning measurements. Moreover, 1008 may be performed by the component 198 in FIGS. 1, 3, 13, 14, and 15.

At 1010, the UE may receive a second set of PRSs from the PRU. For example, 1010 may be performed by the set of PRUs 704 in FIG. 7 or the set of PRUs 802 in FIG. 8, which may receive a second set of PRSs from the PRU. Moreover, 1010 may be performed by the component 198 in FIGS. 1, 3, 13, 14, and 15.

At 1012, the UE may measure the second set of PRSs for a second set of DL positioning measurements after receiving the second set of PRSs from the PRU. For example, 1012 may be performed by the set of PRUs 704 in FIG. 7 or the set of PRUs 802 in FIG. 8, which may measure the second set of PRSs for a second set of DL positioning measurements after receiving the second set of PRSs from the PRU. Moreover, 1012 may be performed by the component 198 in FIGS. 1, 3, 13, 14, and 15.

Figure 11:
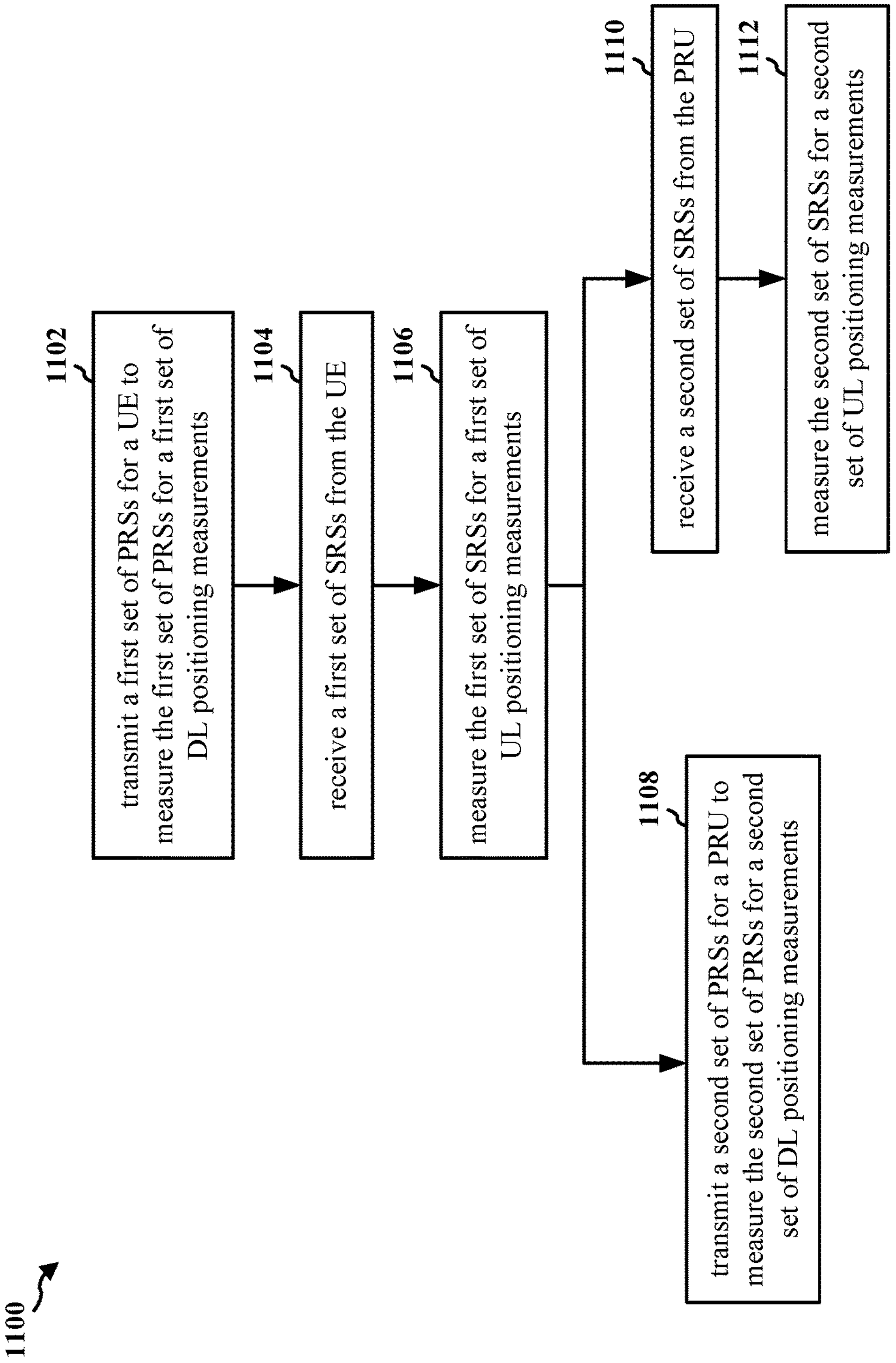
FIG. 11 is a flowchart of a method of wireless communication.

FIG. 11 is a flowchart 1100 of a method of wireless communication. The method may be performed by a network node (e.g., the base station 102, the base station 310; the TRP 506; the set of network nodes 604, the set of network nodes 804; the network entity 606, the network entity 706, the network entity 806; the network entity 1302, the network entity 1402, the network entity 1560; the wireless device 402, the wireless device 406; the PRU 504; the set of PRUs 704, the set of PRUs 802). At 1102, the network node may transmit a first set of PRSs for a UE to measure the first set of PRSs for a first set of DL positioning measurements. For example, 1102 may be performed by the set of PRUs 704 in FIG. 7 or the set of PRUs 802 in FIG. 8, which may transmit a first set of PRSs for a UE to measure the first set of PRSs for a first set of DL positioning measurements. Moreover, 1102 may be performed by the component 198 in FIGS. 1, 3, 13, 14, and 15.

At 1104, the network node may receive a first set of SRSs from the UE. For example, 1104 may be performed by the set of PRUs 704 in FIG. 7 or the set of PRUs 802 in FIG. 8, which may receive a first set of SRSs from the UE. Moreover, 1104 may be performed by the component 198 in FIGS. 1, 3, 13, 14, and 15.

At 1106, the network node may measure the first set of SRSs for a first set of UL positioning measurements. For example, 1106 may be performed by the set of PRUS 704 in FIG. 7 or the set of PRUs 802 in FIG. 8, which may measure the first set of SRSs for a first set of UL positioning measurements. Moreover, 1106 may be performed by the component 198 in FIGS. 1, 3, 13, 14, and 15.

At 1108, the network node may transmit a second set of PRSs for a PRU to measure the second set of PRSs for a second set of DL positioning measurements. For example, 1108 may be performed by the set of PRUs 704 in FIG. 7 or the set of PRUs 802 in FIG. 8, which may transmit a second set of PRSs for a PRU to measure the second set of PRSs for a second set of DL positioning measurements. Moreover, 1108 may be performed by the component 198 in FIGS. 1, 3, 13, 14, and 15.

At 1110, the network node may receive a second set of SRSs from the PRU. For example, 1110 may be performed by the set of PRUs 704 in FIG. 7 or the set of PRUs 802 in FIG. 8, which may receive a second set of SRSs from the PRU. Moreover, 1110 may be performed by the component 198 in FIGS. 1, 3, 13, 14, and 15.

At 1112, the network node may measure the second set of SRSs for a second set of UL positioning measurements. For example, 1112 may be performed by the set of PRUs 704 in FIG. 7 or the set of PRUs 802 in FIG. 8, which may measure the second set of SRSs for a second set of UL positioning measurements. Moreover, 1112 may be performed by the component 198 in FIGS. 1, 3, 13, 14, and 15.

Figure 12:
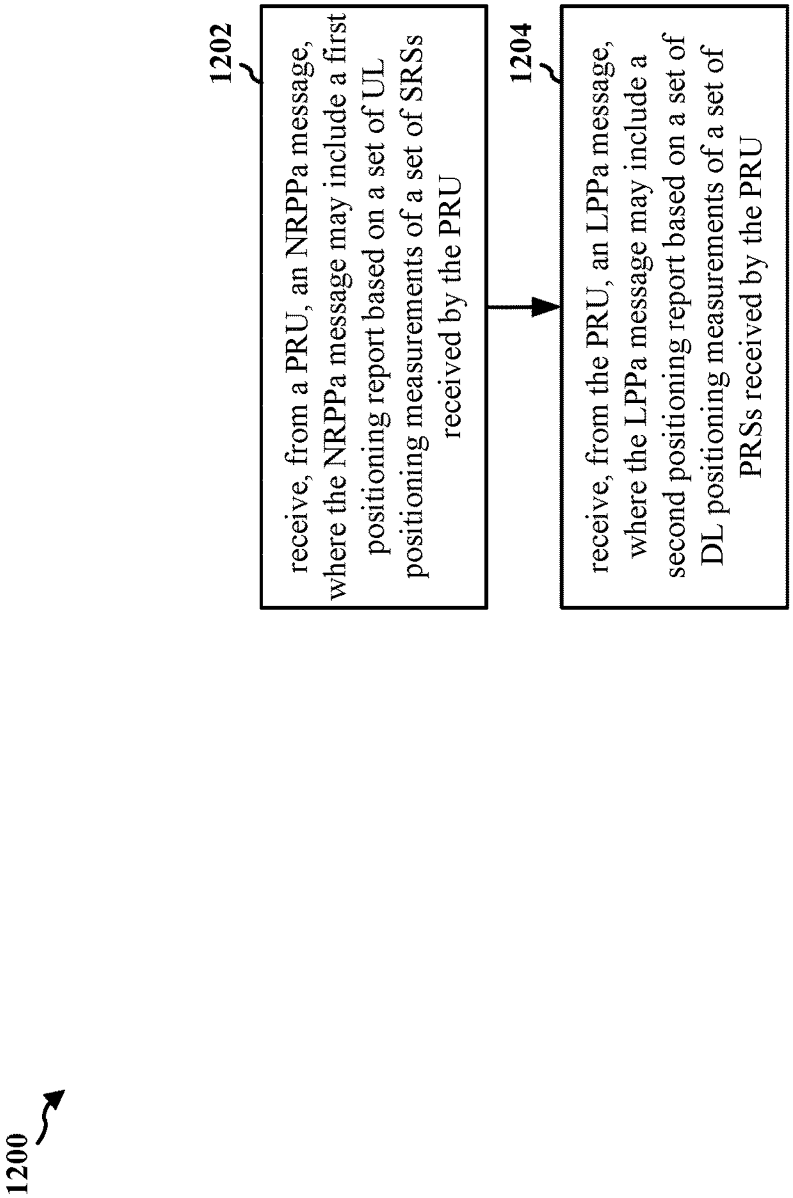
FIG. 12 is a flowchart of a method of wireless communication.

FIG. 12 is a flowchart 1200 of a method of wireless communication. The method may be performed by a first wireless device (e.g., the base station 102, the base station 310; the wireless device 402, the wireless device 406; the TRP 506; the network nodes 604, the set of network nodes 804; the network entity 606, the network entity 706, the network entity 806; the network entity 1302, the network entity 1402, the network entity 1560; the PRU 504; the set of PRUs 704, the set of PRUs 802; the LMF 166; the one or more location servers 168). At 1202, the network node may receive, from a PRU, an NRPPa message, where the NRPPa message may include a first positioning report based on a set of UL positioning measurements of a set of SRSs received by the PRU. For example, 1202 may be performed by the set of PRUs 704 in FIG. 7 or the set of PRUs 802 in FIG. 8, which may receive, from a PRU, an NRPPa message, where the NRPPa message may include a first positioning report based on a set of UL positioning measurements of a set of SRSs received by the PRU. Moreover, 1202 may be performed by the component 198 in FIGS. 1, 3, 13, 14, and 15.

At 1204, the network node may receive, from the PRU, an LPPa message, where the LPPa message may include a second positioning report based on a set of DL positioning measurements of a set of PRSs received by the PRU. For example, 1204 may be performed by the set of PRUs 704 in FIG. 7 or the set of PRUs 802 in FIG. 8, which may receive, from the PRU, an LPPa message, where the LPPa message may include a second positioning report based on a set of DL positioning measurements of a set of PRSs received by the PRU. Moreover, 1204 may be performed by the component 198 in FIGS. 1, 3, 13, 14, and 15.

Figure 13:
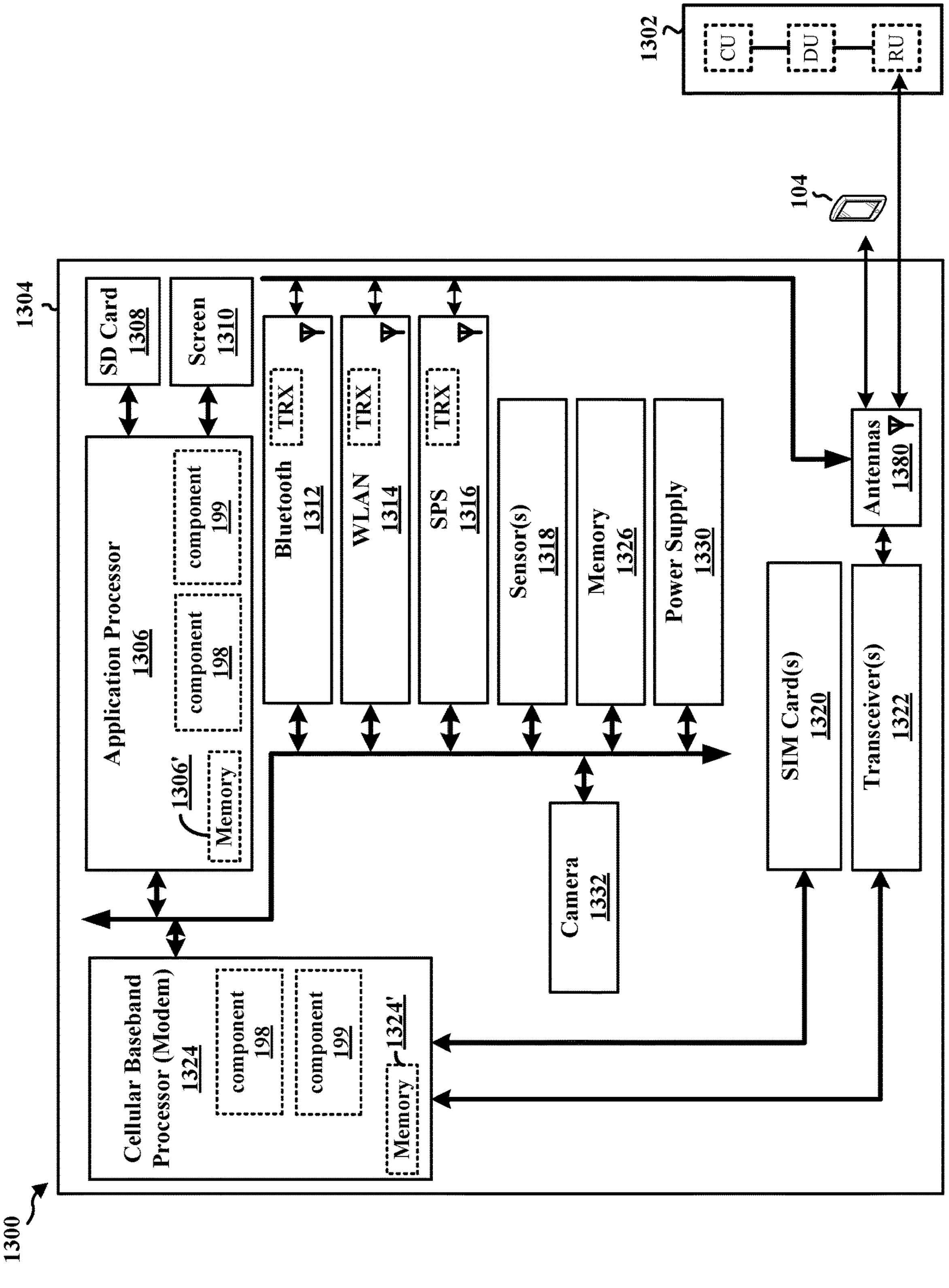
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see UE 350 of FIG. 3) and include the additional modules of the apparatus 1304.

As discussed supra, the component 198 may be configured to transmit a first set of SRSs for a second wireless device to measure the first set of SRSs for a first set of UL positioning measurements. The component 198 may be configured to receive a first set of PRSs from the second wireless device. The component 198 may be configured to measure the first set of PRSs for a first set of DL positioning measurements. The component 198 may be configured to transmit a second set of PRSs for a third wireless device to measure the second set of PRSs for a second set of DL positioning measurements. The component 198 may be configured to receive a second set of SRSs from the third wireless device. The component 198 may be configured to measure the second set of SRSs for a second set of UL positioning measurements after receiving the second set of SRSs from the third wireless device. The apparatus 1304 may be a PRU with a known location. The second wireless device may include a network node, such as the network entity 1302 or a second PRU. The third wireless device may include a UE, such as a different apparatus (e.g., similar to apparatus 1304), or a third PRU. The component 198 may be within the cellular baseband processor 1324, the application processor 1306, or both the cellular baseband processor 1324 and the application processor 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, may include means for transmitting a first set of SRSs for a second wireless device to measure the first set of SRSs for a first set of UL positioning measurements. The apparatus 1304 may include means for receiving a first set of PRSs from the second wireless device. The apparatus 1304 may include means for measuring the first set of PRSs for a first set of DL positioning measurements. The apparatus 1304 may include means for transmitting a second set of PRSs for a third wireless device to measure the second set of PRSs for a second set of DL positioning measurements. The apparatus 1304 may include means for receiving a second set of SRSs from the third wireless device. The apparatus 1304 may include means for measuring the second set of SRSs for a second set of UL positioning measurements after receiving the second set of SRSs from the third wireless device. The second set of UL positioning measurements may include at least one of (a) an RTOA measurement, (b) an UL-AoA measurement, (c) an Rx-Tx time difference measurement, (d) an RSTD measurement, (e) an RSRP measurement, (f) an LOS identification measurement, or (g) an NLOS identification measurement. A measurement of the second set of UL positioning measurements may include at least one of (a) an absolute measurement value, (b) a probability measurement value, (c) a variance measurement value, or (d) a distribution measurement value. The apparatus 1304 may include means for receiving at least one third set of UL positioning measurements from a fourth wireless device. The apparatus 1304 may include means for calculating a position of the third wireless device based on the second set of UL positioning measurements and the at least one third set of UL positioning measurements. The apparatus 1304 may include means for transmitting, for an LMF, an NRPPa message. The NRPPa message may include a positioning report based on the second set of UL positioning measurements. The apparatus 1304 may include means for transmitting, for the LMF, an LPPa message. The LPPa message may include a second positioning report based on the first set of DL positioning measurements. The positioning report may include an indication of a location of the first wireless device. The apparatus 1304 may include means for transmitting, for the third wireless device, an indication of a location of the first wireless device. The apparatus 1304 may include means for receiving a schedule of resources to receive the first set of PRSs from the second wireless device, transmit the first set of SRSs to the second wireless device, receive the second set of SRSs from the third wireless device, or transmit the second set of PRSs to the third wireless device. The apparatus 1304 may include means for receiving the schedule of resources by receiving the schedule of resources from the second wireless device. The apparatus 1304 may include means for receiving the schedule of resources by receiving an RRC message including the schedule of resources. The apparatus 1304 may include means for receiving the schedule of resources by receiving the schedule of resources from an LMF. The apparatus 1304 may include means for receiving the schedule of resources by receiving an NRPPa configuration including the schedule of resources from an LMF. The first set of DL positioning measurements may include at least one of (a) an RSTD measurement, (b) an RSRP measurement, (c) an Rx-Tx time difference measurement, (d) an LOS identification measurement, (e) an NLOS identification measurement, (f) an RTOA measurement, or (g) a DL-AoD measurement. At least one measurement of the first set of DL positioning measurements may include at least one of (a) an absolute measurement value, (b) a probability measurement value, (c) a variance measurement value, or (d) a distribution measurement value. The apparatus 1304 may include means for transmitting, for an LMF, a positioning report based on the first set of PRSs using an LPPa message. The first wireless device may include a first PRU. The second wireless device may include a network node or a second PRU. The third wireless device may include a UE or a third PRU. The first PRU may include a second UE or a second network node. The second UE or the second network node may be in a fixed location while transmitting the second set of PRSs or while receiving the second set of SRSs. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

As discussed supra, the component 199 may be configured to transmit a first set of SRSs for a network node to measure the first set of SRSs for a first set of UL positioning measurements. The component 199 may be configured to receive a first set of PRSs from the network node. The component 199 may be configured to measure the first set of PRSs for a first set of DL positioning measurements. The component 199 may be configured to transmit a second set of SRSs for a PRU to measure the second set of SRSs for a second set of UL positioning measurements. The component 199 may be configured to receive a second set of PRSs from the PRU. The component 199 may be configured to measure the second set of PRSs for a second set of DL positioning measurements after receiving the second set of PRSs from the PRU. The component 199 may be within the cellular baseband processor 1324, the application processor 1306, or both the cellular baseband processor 1324 and the application processor 1306. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, may include means for transmitting a first set of SRSs for a network node to measure the first set of SRSs for a first set of UL positioning measurements. The apparatus 1304 may include means for receiving a first set of PRSs from the network node. The apparatus 1304 may include means for measuring the first set of PRSs for a first set of DL positioning measurements. The apparatus 1304 may include means for transmitting a second set of SRSs for a PRU to measure the second set of SRSs for a second set of UL positioning measurements. The apparatus 1304 may include means for receiving a second set of PRSs from the PRU. The apparatus 1304 may include means for measuring the second set of PRSs for a second set of DL positioning measurements after receiving the second set of PRSs from the PRU. The first set of DL positioning measurements or the second set of DL positioning measurements may include (a) an RSTD measurement, (b) an RSRP measurement, (c) an Rx-Tx time difference measurement, (d) an LOS identification measurement, (e) an NLOS identification measurement, (f) an RTOA measurement, or (g) a DL-AoD measurement. At least one measurement of the first set of DL positioning measurements or the second set of DL positioning measurements may include at least one of (a) an absolute measurement value, (b) a probability measurement value, (c) a variance measurement value, or (d) a distribution measurement value. The apparatus 1304 may include means for receiving, from the PRU, an indication of a location of the PRU. The apparatus 1304 may include means for calculating a position of the UE based on the indication of the location of the PRU and the second set of DL positioning measurements. The apparatus 1304 may include means for receiving, from the PRU, a positioning report based on the second set of UL positioning measurements. The apparatus 1304 may include means for receiving the positioning report by receiving an NRPPa message. The NRPPa message may include the positioning report. The apparatus 1304 may include means for receiving, from the PRU, an indication of a location of the PRU. The apparatus 1304 may include means for calculating a position of the UE based on the indication of the location of the PRU and the positioning report. The apparatus 1304 may include means for training a positioning model based on the positioning report. The means may be the component 199 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
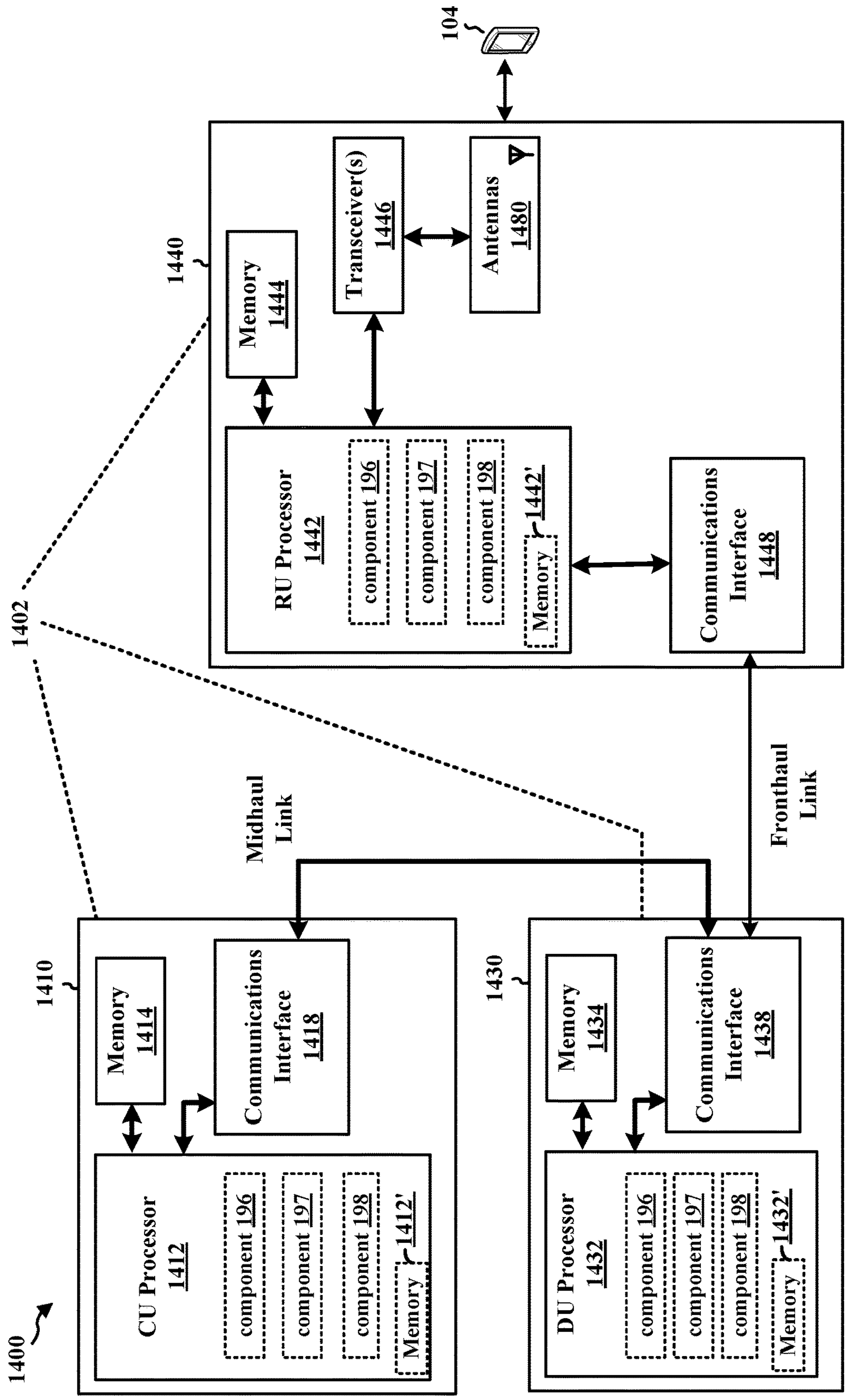
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to transmit a first set of SRSs for a second wireless device to measure the first set of SRSs for a first set of UL positioning measurements. The component 198 may be configured to receive a first set of PRSs from the second wireless device. The component 198 may be configured to measure the first set of PRSs for a first set of DL positioning measurements. The component 198 may be configured to transmit a second set of PRSs for a third wireless device to measure the second set of PRSs for a second set of DL positioning measurements. The component 198 may be configured to receive a second set of SRSs from the third wireless device. The component 198 may be configured to measure the second set of SRSs for a second set of UL positioning measurements after receiving the second set of SRSs from the third wireless device. The network entity 1402 may be a PRU. The network entity 1402 may be a mobile TRP with a fixed location. The second wireless device may include a network node, such as a different network entity (e.g., similar to network entity 1402), or a second PRU. The third wireless device may include a UE or a third PRU. The component 198 may be within one or more processors of one or more of the CU 1410, DU 1430, and the RU 1440. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 may include means for transmitting a first set of SRSs for a second wireless device to measure the first set of SRSs for a first set of UL positioning measurements. The network entity 1402 may include means for receiving a first set of PRSs from the second wireless device. The network entity 1402 may include means for measuring the first set of PRSs for a first set of DL positioning measurements. The network entity 1402 may include means for transmitting a second set of PRSs for a third wireless device to measure the second set of PRSs for a second set of DL positioning measurements. The network entity 1402 may include means for receiving a second set of SRSs from the third wireless device. The network entity 1402 may include means for measuring the second set of SRSs for a second set of UL positioning measurements after receiving the second set of SRSs from the third wireless device. The second set of UL positioning measurements may include at least one of (a) an RTOA measurement, (b) an UL-AoA measurement, (c) an Rx-Tx time difference measurement, (d) an RSTD measurement, (e) an RSRP measurement, (f) an LOS identification measurement, or (g) an NLOS identification measurement. A measurement of the second set of UL positioning measurements may include at least one of (a) an absolute measurement value, (b) a probability measurement value, (c) a variance measurement value, or (d) a distribution measurement value. The network entity 1402 may include means for receiving at least one third set of UL positioning measurements from a fourth wireless device. The network entity 1402 may include means for calculating a position of the third wireless device based on the second set of UL positioning measurements and the at least one third set of UL positioning measurements. The network entity 1402 may include means for transmitting, for an LMF, an NRPPa message. The NRPPa message may include a positioning report based on the second set of UL positioning measurements. The network entity 1402 may include means for transmitting, for the LMF, an LPPa message. The LPPa message may include a second positioning report based on the first set of DL positioning measurements. The positioning report may include an indication of a location of the first wireless device. The network entity 1402 may include means for transmitting, for the third wireless device, an indication of a location of the first wireless device. The network entity 1402 may include means for receiving a schedule of resources to receive the first set of PRSs from the second wireless device, transmit the first set of SRSs to the second wireless device, receive the second set of SRSs from the third wireless device, or transmit the second set of PRSs to the third wireless device. The network entity 1402 may include means for receiving the schedule of resources by receiving the schedule of resources from the second wireless device. The network entity 1402 may include means for receiving the schedule of resources by receiving an RRC message including the schedule of resources. The network entity 1402 may include means for receiving the schedule of resources by receiving the schedule of resources from an LMF. The network entity 1402 may include means for receiving the schedule of resources by receiving an NRPPa configuration including the schedule of resources from an LMF. The first set of DL positioning measurements may include at least one of (a) an RSTD measurement, (b) an RSRP measurement, (c) an Rx-Tx time difference measurement, (d) an LOS identification measurement, (e) an NLOS identification measurement, (f) an RTOA measurement, or (g) a DL-AoD measurement. At least one measurement of the first set of DL positioning measurements may include at least one of (a) an absolute measurement value, (b) a probability measurement value, (c) a variance measurement value, or (d) a distribution measurement value. The network entity 1402 may include means for transmitting, for an LMF, a positioning report based on the first set of PRSs using an LPPa message. The first wireless device may include a first PRU. The second wireless device may include a network node or a second PRU. The third wireless device may include a UE or a third PRU. The first PRU may include a second UE or a second network node. The second UE or the second network node may be in a fixed location while transmitting the second set of PRSs or while receiving the second set of SRSs. The means may be the component 198 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

As discussed supra, the component 197 may be configured to transmit a first set of PRSs for a UE to measure the first set of PRSs for a first set of DL positioning measurements. The component 197 may be configured to receive a first set of SRSs from the UE. The component 197 may be configured to measure the first set of SRSs for a first set of UL positioning measurements. The component 197 may be configured to transmit a second set of PRSs for a PRU to measure the second set of PRSs for a second set of DL positioning measurements. The component 197 may be configured to receive a second set of SRSs from the PRU. The component 197 may be configured to measure the second set of SRSs for a second set of UL positioning measurements. The network entity 1402 may serve the UE. The component 197 may be within one or more processors of one or more of the CU 1410, DU 1430, and the RU 1440. The component 197 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 may include means for transmitting a first set of PRSs for a UE to measure the first set of PRSs for a first set of DL positioning measurements. The network entity 1402 may include means for receiving a first set of SRSs from the UE. The network entity 1402 may include means for measuring the first set of SRSs for a first set of UL positioning measurements. The network entity 1402 may include means for transmitting a second set of PRSs for a PRU to measure the second set of PRSs for a second set of DL positioning measurements. The network entity 1402 may include means for receiving a second set of SRSs from the PRU. The network entity 1402 may include means for measuring the second set of SRSs for a second set of UL positioning measurements. The first set of UL positioning measurements or the second set of UL positioning measurements may include at least one of (a) an RTOA measurement, (b) an UL-AoA measurement, (c) an Rx-Tx time difference measurement, (d) an RSTD measurement, (e) an RSRP measurement, (f) an LOS identification measurement, or (g) an NLOS identification measurement. A measurement of the first set of UL positioning measurements or the second set of UL positioning measurements may include at least one of (a) an absolute measurement value, (b) a probability measurement value, (c) a variance measurement value, or (d) a distribution measurement value. The network entity 1402 may include means for receiving at least one third set of UL positioning measurements from a wireless device. The network entity 1402 may include means for calculating a position of the PRU based on the second set of UL positioning measurements and the at least one third set of UL positioning measurements. The network entity 1402 may include means for transmitting an NRPPa message to an LMF. The NRPPa message may include a positioning report based on at least one of the first set of UL positioning measurements or the second set of UL positioning measurements. The positioning report may include an indication of a location of the PRU. The network entity 1402 may include means for receiving an indication of a location of the PRU from the PRU. The network entity 1402 may include means for calculating a position of a wireless device based on the indication of the PRU and the second set of UL positioning measurements. The network entity 1402 may include means for transmitting, for the PRU, a schedule of resources to receive the second set of PRSs from the network node or to transmit the second set of SRSs to the network node. The network entity 1402 may include means for transmitting, for the PRU, a schedule of resources to transmit a third set of PRSs to the UE or to receive a third set of SRSs from the UE. The network entity 1402 may include means for transmitting the schedule of resources by transmitting an RRC message including the schedule of resources. The means may be the component 197 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

As discussed supra, the component 196 may be configured to receive, from a PRU, an NRPPa message. The NRPPa message may include a first positioning report based on a set of UL positioning measurements of a set of SRSs received by the PRU. The component 196 may be configured to receive, from the PRU, an LPPa message. The LPPa message may include a second positioning report based on a set of DL positioning measurements of a set of PRSs received by the PRU. The component 196 may be configured to perform positioning on a wireless device communicating with the PRU based on the first and second positioning reports. The component 196 may be within one or more processors of one or more of the CU 1410, DU 1430, and the RU 1440. The component 196 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 may include means for receiving, from a PRU, an NRPPa message. The NRPPa message may include a first positioning report based on a set of UL positioning measurements of a set of SRSs received by the PRU. The network entity 1402 may include means for receiving, from the PRU, an LPPa message. The LPPa message may include a second positioning report based on a set of DL positioning measurements of a set of PRSs received by the PRU. The network entity 1402 may include means for transmitting, to the PRU, a first schedule of resources to receive the set of SRSs from a first wireless device. The network entity 1402 may include means for transmitting, to the PRU, a second schedule of resources to receive the set of PRSs from a second wireless device. The network entity 1402 may include means for transmitting the first schedule of resources by transmitting an NRPPa configuration including the first schedule of resources. The network entity 1402 may include means for transmitting the second schedule of resources by transmitting an LPPa configuration including the second schedule of resources. The network entity 1402 may include means for training a positioning model based on the first positioning report and the second positioning report. The network entity 1402 may include an LMF. The means may be the component 196 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Figure 15:
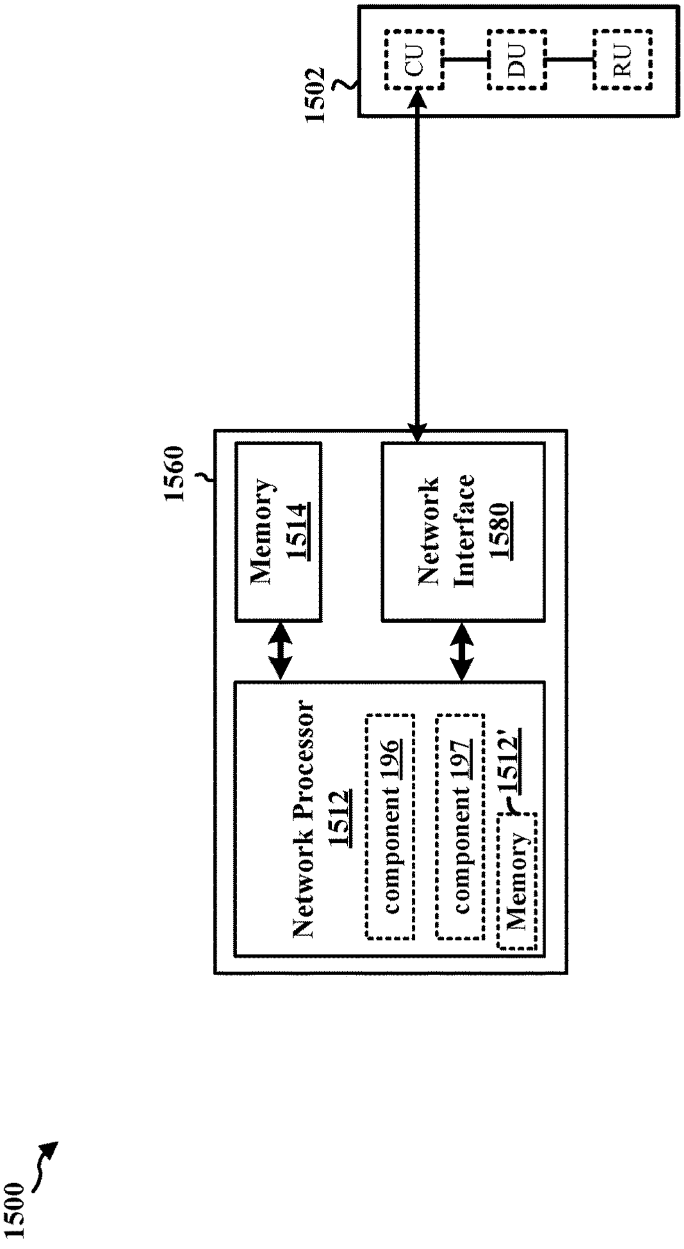
FIG. 15 is a diagram illustrating an example of a hardware implementation for an example network entity.

FIG. 15 is a diagram 1500 illustrating an example of a hardware implementation for a network entity 1560. In one example, the network entity 1560 may be within the core network 120. The network entity 1560 may include a network processor 1512. The network processor 1512 may include on-chip memory 1512'. In some aspects, the network entity 1560 may further include additional memory modules 1514. The network entity 1560 communicates via the network interface 1580 directly (e.g., backhaul link) or indirectly (e.g., through a RIC) with the CU 1502. The on-chip memory 1512' and the additional memory modules 1514 may each be considered a computer-readable medium/memory. Each computer-readable medium/memory may be non-transitory. The processor 1512 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 197 may be configured to transmit a first set of PRSs for a UE to measure the first set of PRSs for a first set of DL positioning measurements. The component 197 may be configured to receive a first set of SRSs from the UE. The component 197 may be configured to measure the first set of SRSs for a first set of UL positioning measurements. The component 197 may be configured to transmit a second set of PRSs for a PRU to measure the second set of PRSs for a second set of DL positioning measurements. The component 197 may be configured to receive a second set of SRSs from the PRU. The component 197 may be configured to measure the second set of SRSs for a second set of UL positioning measurements. The network entity 1560 may serve the UE. The component 197 may be within the processor 1512. The component 197 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1560 may include a variety of components configured for various functions. In one configuration, the network entity 1560 may include means for transmitting a first set of PRSs for a UE to measure the first set of PRSs for a first set of DL positioning measurements. The network entity 1560 may include receiving a first set of SRSs from the UE. The network entity 1560 may include measuring the first set of SRSs for a first set of UL positioning measurements. The network entity 1560 may include transmitting a second set of PRSs for a PRU to measure the second set of PRSs for a second set of DL positioning measurements. The network entity 1560 may include receiving a second set of SRSs from the PRU. The network entity 1560 may include measuring the second set of SRSs for a second set of UL positioning measurements. The first set of UL positioning measurements or the second set of UL positioning measurements may include at least one of (a) an RTOA measurement, (b) an UL-AoA measurement, (c) an Rx-Tx time difference measurement, (d) an RSTD measurement, (e) an RSRP measurement, (f) an LOS identification measurement, or (g) an NLOS identification measurement. A measurement of the first set of UL positioning measurements or the second set of UL positioning measurements may include at least one of (a) an absolute measurement value, (b) a probability measurement value, (c) a variance measurement value, or (d) a distribution measurement value. The network entity 1560 may include receiving at least one third set of UL positioning measurements from a wireless device. The network entity 1560 may include calculating a position of the PRU based on the second set of UL positioning measurements and the at least one third set of UL positioning measurements. The network entity 1560 may include transmitting an NRPPa message to an LMF. The NRPPa message may include a positioning report based on at least one of the first set of UL positioning measurements or the second set of UL positioning measurements. The positioning report may include an indication of a location of the PRU. The network entity 1560 may include receiving an indication of a location of the PRU from the PRU. The network entity 1560 may include calculating a position of a wireless device based on the indication of the PRU and the second set of UL positioning measurements. The network entity 1560 may include transmitting, for the PRU, a schedule of resources to receive the second set of PRSs from the network node or to transmit the second set of SRSs to the network node. The network entity 1560 may include transmitting, for the PRU, a schedule of resources to transmit a third set of PRSs to the UE or to receive a third set of SRSs from the UE. The network entity 1560 may include transmitting the schedule of resources by transmitting an RRC message including the schedule of resources. The means may be the component 197 of the network entity 1560 configured to perform the functions recited by the means.

As discussed supra, the component 196 may be configured to receive, from a PRU, an NRPPa message. The NRPPa message may include a first positioning report based on a set of UL positioning measurements of a set of SRSs received by the PRU. The component 196 may be configured to receive, from the PRU, an LPPa message. The LPPa message may include a second positioning report based on a set of DL positioning measurements of a set of PRSs received by the PRU. The component 196 may be configured to perform positioning on a wireless device communicating with the PRU based on the first and second positioning reports. The component 196 may be within the processor 1512. The component 196 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1560 may include a variety of components configured for various functions. In one configuration, the network entity 1560 may include means for receiving, from a PRU, an NRPPa message. The NRPPa message may include a first positioning report based on a set of UL positioning measurements of a set of SRSs received by the PRU. The network entity 1560 may include receiving, from the PRU, an LPPa message. The LPPa message may include a second positioning report based on a set of DL positioning measurements of a set of PRSs received by the PRU. The network entity 1560 may include transmitting, to the PRU, a first schedule of resources to receive the set of SRSs from a first wireless device. The network entity 1560 may include transmitting, to the PRU, a second schedule of resources to receive the set of PRSs from a second wireless device. The network entity 1560 may include transmitting the first schedule of resources by transmitting an NRPPa configuration including the first schedule of resources. The network entity 1560 may include transmitting the second schedule of resources by transmitting an LPPa configuration including the second schedule of resources. The network entity 1560 may include training a positioning model based on the first positioning report and the second positioning report. The network entity 1560 may include an LMF. The means may be the component 196 of the network entity 1560 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive the data, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first wireless device, where the method may include transmitting a first set of SRSs for a second wireless device to measure the first set of SRSs for a first set of UL positioning measurements. The method may include receiving a first set of PRSs from the second wireless device. The method may include measuring the first set of PRSs for a first set of DL positioning measurements. The method may include transmitting a second set of PRSs for a third wireless device to measure the second set of PRSs for a second set of DL positioning measurements. The method may include receiving a second set of SRSs from the third wireless device.

Aspect 2 is the method of aspect 1, where the method may include measuring the second set of SRSs for a second set of UL positioning measurements after receiving the second set of SRSs from the third wireless device.

Aspect 3 is the method of aspect 2, where the second set of UL positioning measurements may include at least one of (a) an RTOA measurement, (b) an UL-AoA measurement, (c) an Rx-Tx time difference measurement, (d) an RSTD measurement, (e) an RSRP measurement, (f) an LOS identification measurement, or (g) an NLOS identification measurement.

Aspect 4 is the method of either of aspects 2 or 3, where the method may include receiving at least one third set of UL positioning measurements from a fourth wireless device. The method may include calculating a position of the third wireless device based on the second set of UL positioning measurements and the at least one third set of UL positioning measurements.

Aspect 5 is the method of any of aspects 2 to 4, where the method may include transmitting, for an LMF, an NRPPa message. The NRPPa message may include a positioning report based on the second set of UL positioning measurements.

Aspect 6 is the method of aspect 5, where the method may include transmitting, for the LMF, an LPPa message. The LPPa message may include a second positioning report based on the first set of DL positioning measurements.

Aspect 7 is the method of aspect 6, where the positioning report may include an indication of a location of the first wireless device.

Aspect 8 is the method of any of aspects 1 to 7, where the method may include transmitting, for the third wireless device, an indication of a location of the first wireless device.

Aspect 9 is the method of any of aspects 1 to 8, where the method may include receiving a schedule of resources to receive the first set of PRSs from the second wireless device, transmit the first set of SRSs to the second wireless device, receive the second set of SRSs from the third wireless device, or transmit the second set of PRSs to the third wireless device.

Aspect 10 is the method of aspect 9, where receiving the schedule of resources may include receiving the schedule of resources from the second wireless device.

Aspect 11 is the method of either of aspects 9 or 10, where receiving the schedule of resources may include receiving an RRC message including the schedule of resources.

Aspect 12 is the method of any of aspects 9 to 11, where receiving the schedule of resources may include receiving the schedule of resources from an LMF.

Aspect 13 is the method of any of aspects 9 to 12, where receiving the schedule of resources may include receiving an NRPPa configuration including the schedule of resources from an LMF.

Aspect 14 is the method of any of aspects 1 to 13, where the first set of DL positioning measurements may include at least one of (a) an RSTD measurement, (b) an RSRP measurement, (c) an Rx-Tx time difference measurement, (d) an LOS identification measurement, (e) an NLOS identification measurement, (f) an RTOA measurement, or (g) a DL-AoD measurement.

Aspect 15 is the method of aspect 14, where at least one measurement of the first set of DL positioning measurements may include at least one of (a) an absolute measurement value, (b) a probability measurement value, (c) a variance measurement value, or (d) a distribution measurement value.

Aspect 16 is the method of any of aspects 1 to 15, where the method may include transmitting, for an LMF, a positioning report based on the first set of PRSs using an LPPa message.

Aspect 17 is the method of any of aspects 1 to 16, where the first wireless device may include a first PRU. The second wireless device may include a network node or a second PRU. The third wireless device may include a UE or a third PRU.

Aspect 18 is the method of aspect 17, where the first PRU may include a second UE or a second network node. The second UE or the second network node may be in a fixed location while transmitting the second set of PRSs or while receiving the second set of SRSs.

Aspect 19 is a method of wireless communication at a UE, where the method may include transmitting a first set of SRSs for a network node to measure the first set of SRSs for a first set of UL positioning measurements. The method may include receiving a first set of PRSs from the network node. The method may include measuring the first set of PRSs for a first set of DL positioning measurements. The method may include transmitting a second set of SRSs for a PRU to measure the second set of SRSs for a second set of UL positioning measurements. The method may include receiving a second set of PRSs from the PRU.

Aspect 20 is the method of aspect 19, where the method may include measuring the second set of PRSs for a second set of DL positioning measurements after receiving the second set of PRSs from the PRU.

Aspect 21 is the method of aspect 20, where the first set of DL positioning measurements or the second set of DL positioning measurements may include (a) an RSTD measurement, (b) an RSRP measurement, (c) an Rx-Tx time difference measurement, (d) an LOS identification measurement, (e) an NLOS identification measurement, (f) an RTOA measurement, or (g) a DL-AoD measurement.

Aspect 22 is the method of aspect 21, where at least one measurement of the first set of DL positioning measurements or the second set of DL positioning measurements may include at least one of (a) an absolute measurement value, (b) a probability measurement value, (c) a variance measurement value, or (d) a distribution measurement value.

Aspect 23 is the method of any of aspects 20 to 22, where the method may include receiving, from the PRU, an indication of a location of the PRU. The method may include calculating a position of the UE based on the indication of the location of the PRU and the second set of DL positioning measurements.

Aspect 24 is the method of any of aspects 19 to 23, where the method may include receiving, from the PRU, a positioning report based on the second set of UL positioning measurements.

Aspect 25 is the method of aspect 24, where receiving the positioning report may include receiving an NRPPa message. The NRPPa message may include the positioning report.

Aspect 26 is the method of either of aspects 24 or 25, where the method may include receiving, from the PRU, an indication of a location of the PRU. The method may include calculating a position of the UE based on the indication of the location of the PRU and the positioning report.

Aspect 27 is the method of any of aspects 24 to 26, where the method may include training a positioning model based on the positioning report.

Aspect 28 is a method of wireless communication at a network node, where the method may include transmitting a first set of PRSs for a UE to measure the first set of PRSs for a first set of DL positioning measurements. The method may include receiving a first set of SRSs from the UE. The method may include measuring the first set of SRSs for a first set of UL positioning measurements. The method may include transmitting a second set of PRSs for a PRU to measure the second set of PRSs for a second set of DL positioning measurements. The method may include receiving a second set of SRSs from the PRU.

Aspect 29 is the method of aspect 28, where the method may include measuring the second set of SRSs for a second set of UL positioning measurements.

Aspect 30 is the method of aspect 29, where the first set of UL positioning measurements or the second set of UL positioning measurements may include at least one of (a) an RTOA measurement, (b) an UL-AoA measurement, (c) an Rx-Tx time difference measurement, (d) an RSTD measurement, (e) an RSRP measurement, (f) an LOS identification measurement, or (g) an NLOS identification measurement.

Aspect 31 is the method of aspect 30, where the method may include receiving at least one third set of UL positioning measurements from a wireless device. The method may include calculating a position of the PRU based on the second set of UL positioning measurements and the at least one third set of UL positioning measurements.

Aspect 32 is the method of either of aspects 30 or 31, where the method may include transmitting an NRPPa message to an LMF. The NRPPa message may include a positioning report based on at least one of the first set of UL positioning measurements or the second set of UL positioning measurements.

Aspect 33 is the method of aspect 32, where the positioning report may include an indication of a location of the PRU.

Aspect 34 is the method of any of aspects 29 to 33, where the method may include receiving an indication of a location of the PRU from the PRU. The method may include calculating a position of a wireless device based on the indication of the PRU and the second set of UL positioning measurements.

Aspect 35 is the method of any of aspects 28 to 34, where the method may include transmitting, for the PRU, a schedule of resources to receive the second set of PRSs from the network node or to transmit the second set of SRSs to the network node.

Aspect 36 is the method of any of aspects 28 to 35, where the method may include transmitting, for the PRU, a schedule of resources to transmit a third set of PRSs to the UE or to receive a third set of SRSs from the UE.

Aspect 37 is the method of aspect 36, where transmitting the schedule of resources may include transmitting an RRC message including the schedule of resources.

Aspect 38 is a method of wireless communication at a network node, where the method may include receiving, from a PRU, an NRPPa message. The NRPPa message may include a first positioning report based on a set of UL positioning measurements of a set of SRSs received by the PRU. The method may include receiving, from the PRU, an LPPa message. The LPPa message may include a second positioning report based on a set of DL positioning measurements of a set of PRSs received by the PRU.

Aspect 39 is the method of aspect 38, where the method may include transmitting, to the PRU, a first schedule of resources to receive the set of SRSs from a first wireless device. The method may include transmitting, to the PRU, a second schedule of resources to receive the set of PRSs from a second wireless device.

Aspect 40 is the method of aspect 39, where transmitting the first schedule of resources may include transmitting an NRPPa configuration including the first schedule of resources.

Aspect 41 is the method of aspect 40, where transmitting the second schedule of resources may include transmitting an LPPa configuration including the second schedule of resources.

Aspect 42 is the method of any of aspects 38 to 41, where the method may include training a positioning model based on the first positioning report and the second positioning report.

Aspect 43 is the method of any of aspects 38 to 42, where the network node may include an LMF.

Aspect 44 is the method of aspect 43, where a measurement of the second set of UL positioning measurements may include at least one of (a) an absolute measurement value, (b) a probability measurement value, (c) a variance measurement value, or (d) a distribution measurement value.

Aspect 45 is the method of aspect 30, where a measurement of the first set of UL positioning measurements or the second set of UL positioning measurements may include at least one of (a) an absolute measurement value, (b) a probability measurement value, (c) a variance measurement value, or (d) a distribution measurement value.

Aspect 46 is an apparatus for wireless communication, including: a memory; and at least one processor coupled to the memory and, based at least in part on information stored in the memory, the at least one processor is configured to implement any of aspects 1 to 45.

Aspect 47 is the apparatus of aspect 46, further including at least one of an antenna or a transceiver coupled to the at least one processor.

Aspect 48 is an apparatus for wireless communication including means for implementing any of aspects 1 to 45.

Aspect 49 is a computer-readable medium (e.g., a non-transitory computer-readable medium) storing computer executable code, where the code when executed by a processor causes the processor to implement any of aspects 1 to 45.

What is claimed is:

1. An apparatus for wireless communication at a positioning reference unit (PRU), comprising:
- memory; and
- at least one processor coupled to the memory and, based at least in part on information stored in the memory, the at least one processor is configured to:
  - transmit a first set of uplink (UL) sounding reference signals (UL-SRSs) for a network node to measure the first set of UL-SRSs for a first set of uplink (UL) positioning measurements;
  - receive a first set of downlink (DL) positioning reference signals (DL-PRSs) from the network node;
  - measure the first set of DL-PRSs for a first set of downlink (DL) positioning measurements;
  - transmit a first report based on the first set of DL positioning measurements;
  - transmit a second set of DL-PRSs to a user equipment (UE) third wireless device for a measurement of the second set of DL-PRSs for a second set of DL positioning measurements;
  - receive a second set of UL-SRSs from the UE;
  - measure the received second set of UL-SRSs for a second set of UL positioning measurements; and
  - transmit a second report based on the second set of UL positioning measurements.

2. The apparatus of claim 1, wherein the second set of UL positioning measurements comprises at least one of:
- a relative time of arrival (RTOA) measurement;
- an UL angle-of-arrival (UL-AoA) measurement;
- a receive (Rx) transmit (Tx) (Rx-Tx) time difference measurement;
- a reference signal time difference (RSTD) measurement;
- a reference signal received power (RSRP) measurement;
- a line-of-sight (LOS) identification measurement; or
- a non-line-of-sight (NLOS) identification measurement.

3. The apparatus of claim 1, wherein the at least one processor is further configured to:
- receive a first measurement report from the UE based on the transmitted second set of DL-PRSs;
- receive a second measurement report associated with the second set of UL-SRSs from a fourth wireless device; and
- determine a position of the UE based on the second set of UL positioning measurements, the first measurement report, and the second measurement report.

4. The apparatus of claim 1, wherein, to transmit the second report based on the second set of UL positioning measurements, the at least one processor is further configured to:

transmit, for a location management function (LMF), a new radio (NR) positioning protocol (NRPP) annex (NRPPa) message, wherein the NRPPa message comprises the second report, wherein the second report is further based on the transmitted second set of DL-PRSs.

5. The apparatus of claim 4, wherein, to transmit the first report based on the first set of DL positioning measurements the at least one processor is further configured to:

transmit, for the LMF, a long-term evolution (LTE) positioning protocol (LPP) annex (LPPa) message, wherein the LPPa message comprises the first report, wherein the first report is further based on the transmitted first set of UL-SRSs.

6. The apparatus of claim 5, wherein the first report comprises an indication of a location of the PRU.

7. The apparatus of claim 1, further comprising a transceiver coupled to the at least one processor, wherein the at least one processor is further configured to:

transmit, via the transceiver, to the UE, an indication of a location of the PRU.

8. The apparatus of claim 1, wherein the at least one processor is further configured to:

receive a schedule of resources associated with the received first set of DL-PRSs from the network node.

9. The apparatus of claim 8, wherein, to receive the schedule of resources, the at least one processor is configured to:

receive a radio resource control (RRC) message comprising the schedule of resources.

10. The apparatus of claim 8, wherein, to receive the schedule of resources, the at least one processor is configured to:

receive the schedule of resources from a location management function (LMF).

11. The apparatus of claim 8, wherein, to receive the schedule of resources, the at least one processor is configured to:

receive a new radio (NR) positioning protocol (NRPP) annex (NRPPa) configuration comprising the schedule of resources from a location management function (LMF).

12. The apparatus of claim 1, wherein the first set of DL positioning measurements comprises at least one of:

a reference signal time difference (RSTD) measurement;
a reference signal received power (RSRP) measurement;
a receive (Rx) transmit (Tx) (Rx-Tx) time difference measurement;
a line-of-sight (LOS) identification measurement;
a non-line-of-sight (NLOS) identification measurement;
a relative time of arrival (RTOA) measurement; or
a DL angle-of-departure (DL-AoD) measurement.

13. The apparatus of claim 12, wherein, to measure the first set of DL-PRSs, the at least one processor is further configured to:

measure, based on the first set of DL-PRSs, at least one of:
an absolute measurement value;
a probability measurement value;
a variance measurement value; or
a distribution measurement value.

14. The apparatus of claim 1, wherein, to transmit the first report based on the first set of DL positioning measurements, the at least one processor is further configured to:

transmit, for a location management function (LMF), a long-term evolution (LTE) positioning protocol (LPP) annex (LPPa) message comprising the first report.

15. The apparatus of claim 1, wherein the PRU comprises a second UE or a second network node comprising a fixed location.

16. An apparatus for wireless communication at a user equipment (UE), comprising:

memory; and at least one processor coupled to the memory and, based at least in part on information stored in the memory, the at least one processor is configured to:

transmit a first set of uplink (UL) sounding reference signals (UL-SRSs) for a network node to measure the first set of UL-SRSs for a first set of uplink (UL) positioning measurements;

receive a first set of downlink (DL) positioning reference signal (DL-PRSs) from the network node;

measure the received first set of DL-PRSs for a first set of downlink (DL) positioning measurements;

transmit a second set of UL-SRSs for a positioning reference unit (PRU) to measure the second set of UL-SRSs for a second set of UL positioning measurements;

receive a second set of DL-PRSs from the PRU;

measure the received second set of DL-PRSs for a second set of DL positioning measurements; and transmit a report based on the first set of DL positioning measurements and the second set of DL positioning measurements.

17. The apparatus of claim 16, wherein the first set of DL positioning measurements or the second set of DL positioning measurements comprises at least one of:

a reference signal time difference (RSTD) measurement;
a reference signal received power (RSRP) measurement;
a receive (Rx) transmit (Tx) (Rx-Tx) time difference measurement;
a line-of-sight (LOS) identification measurement;
a non-line-of-sight (NLOS) identification measurement;
a relative time of arrival (RTOA) measurement; or
a DL angle-of-departure (DL-AoD) measurement.

18. The apparatus of claim 17, wherein at least one measurement of the first set of DL positioning measurements or the second set of DL positioning measurements comprises at least one of:

an absolute measurement value;
a probability measurement value;
a variance measurement value; or
a distribution measurement value.

19. The apparatus of claim 16, further comprising a transceiver coupled to the at least one processor, wherein the at least one processor is further configured to:

receive, via the transceiver, from the PRU, an indication of a location of the PRU; and determine a position of the UE based on the first set of DL positioning measurements, the indication of the location of the PRU, and the second set of DL positioning measurements.

20. The apparatus of claim 16, wherein the at least one processor is further configured to:

receive, from the PRU, a positioning report based on the second set of UL positioning measurements.

21. The apparatus of claim 20, wherein, to receive the positioning report, the at least one processor is configured to:

receive a new radio (NR) positioning protocol (NRPP) annex (NRPPa) message, wherein the NRPPa message comprises the positioning report.

22. The apparatus of claim 20, wherein the at least one processor is further configured to:

receive, from the PRU, an indication of a location of the PRU; and determine a position of the UE based on the indication of the location of the PRU and the positioning report.

23. The apparatus of claim 20, wherein the at least one processor is further configured to:

train a positioning model based on the positioning report.

24. A method of wireless communication at a positioning reference unit (PRU), comprising:

transmitting a first set of uplink (UL) sounding reference signals (UL-SRSs) for a network node to measure the first set of UL-SRSs for a first set of uplink (UL) positioning measurements;

receiving a first set of downlink (DL) positioning reference signals (DL-PRSs) from the network node;

measuring the first set of DL-PRSs for a first set of downlink (DL) positioning measurements;

transmitting a first report based on the first set of DL positioning measurements;

transmitting a second set of DL-PRSs to a user equipment (UE) third wireless device for a measurement of the second set of DL-PRSs for a second set of DL positioning measurements;

receiving a second set of UL-SRSs from the UE;

measuring the received second set of UL-SRSs for a second set of UL positioning measurements; and transmitting a second report based on the second set of UL positioning measurements.

25. A method of wireless communication at a user equipment (UE), comprising:

transmitting a first set of uplink (UL) sounding reference signals (UL-SRSs) for a network node to measure the first set of UL-SRSs for a first set of uplink (UL) positioning measurements;

receiving a first set of downlink (DL) positioning reference signal (DL-PRSs) from the network node;

measuring the received first set of DL-PRSs for a first set of downlink (DL) positioning measurements;

transmitting a second set of UL-SRSs for a positioning reference unit (PRU) to measure the second set of UL-SRSs for a second set of UL positioning measurements;

receiving a second set of DL-PRSs from the PRU;

measuring the received second set of DL-PRSs for a second set of DL positioning measurements; and transmitting a report based on the first set of DL positioning measurements and the second set of DL positioning measurements.

* * * * *